(12) United States Patent
Dai et al.

(10) Patent No.: US 8,620,081 B2
(45) Date of Patent: Dec. 31, 2013

(54) IMAGE PROCESSING APPARATUS, METHOD, AND STORAGE MEDIUM FOR DETERMINING ATTRIBUTES

(75) Inventors: Xiaoyan Dai, Yokohama (JP); Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 13/290,804

(22) Filed: Nov. 7, 2011

(65) Prior Publication Data

US 2012/0114230 A1 May 10, 2012

(30) Foreign Application Priority Data

Nov. 9, 2010 (JP) ................................. 2010-251161

(51) Int. Cl.
*G06K 9/00* (2006.01)
(52) U.S. Cl.
USPC ............ 382/176; 382/162; 382/165; 382/171
(58) Field of Classification Search
USPC .................................................. 382/162–176
See application file for complete search history.

(56) References Cited

U.S. PATENT DOCUMENTS

| | | | | |
|---|---|---|---|---|
| 5,768,403 A * | 6/1998 | Suzuki et al. | ................... | 358/2.1 |
| 5,909,505 A * | 6/1999 | Katayama et al. | ............ | 382/164 |
| 6,798,905 B1 * | 9/2004 | Sugiura et al. | ................ | 382/168 |
| 8,295,592 B2 * | 10/2012 | Washio | ......................... | 382/162 |
| 8,335,375 B2 * | 12/2012 | Yamazaki | ..................... | 382/166 |
| 2002/0159106 A1 * | 10/2002 | Fuchigami et al. | ........... | 358/518 |
| 2007/0263930 A1 * | 11/2007 | Ito | ................................ | 382/177 |
| 2008/0030812 A1 * | 2/2008 | Mori | ............................. | 358/505 |
| 2010/0054586 A1 * | 3/2010 | Yamazaki | ..................... | 382/164 |
| 2010/0054591 A1 * | 3/2010 | Shiraishi | ....................... | 382/167 |
| 2010/0260417 A1 * | 10/2010 | Dai | ............................... | 382/165 |
| 2011/0158517 A1 * | 6/2011 | Dai | ............................... | 382/165 |
| 2011/0164284 A1 * | 7/2011 | Dai | ............................... | 358/3.06 |

FOREIGN PATENT DOCUMENTS

JP 5-328143 A 12/1993

\* cited by examiner

*Primary Examiner* — Li Liu
(74) *Attorney, Agent, or Firm* — Canon USA Inc. IP Division

(57) ABSTRACT

An image processing apparatus determines an attribute of a block image based on the attribute of the block image determined based on a color distribution characteristic amount of the block image and the attribute of the block image determined based on an edge characteristic amount of the block image.

19 Claims, 16 Drawing Sheets

COLOR DISTRIBUTION
CHART

BIN HAVING DIFFERENT HUE RANGE

DISTANCE BETWEEN BINS IS EQUAL TO OR LONGER THAN PREDETERMINED DISTANCE IN DIRECTION OF LUMINOSITY AXIS

DIFFERENCE BETWEEN AVERAGE HUE VALUES OF BINS IS LARGER THAN HUE DIFFERENCE THRESHOLD VALUE

DIFFERENCE BETWEEN AVERAGE LUMINOSITY VALUES OF BINS IS LARGER THAN LUMINOSITY DIFFERENCE THRESHOLD VALUE

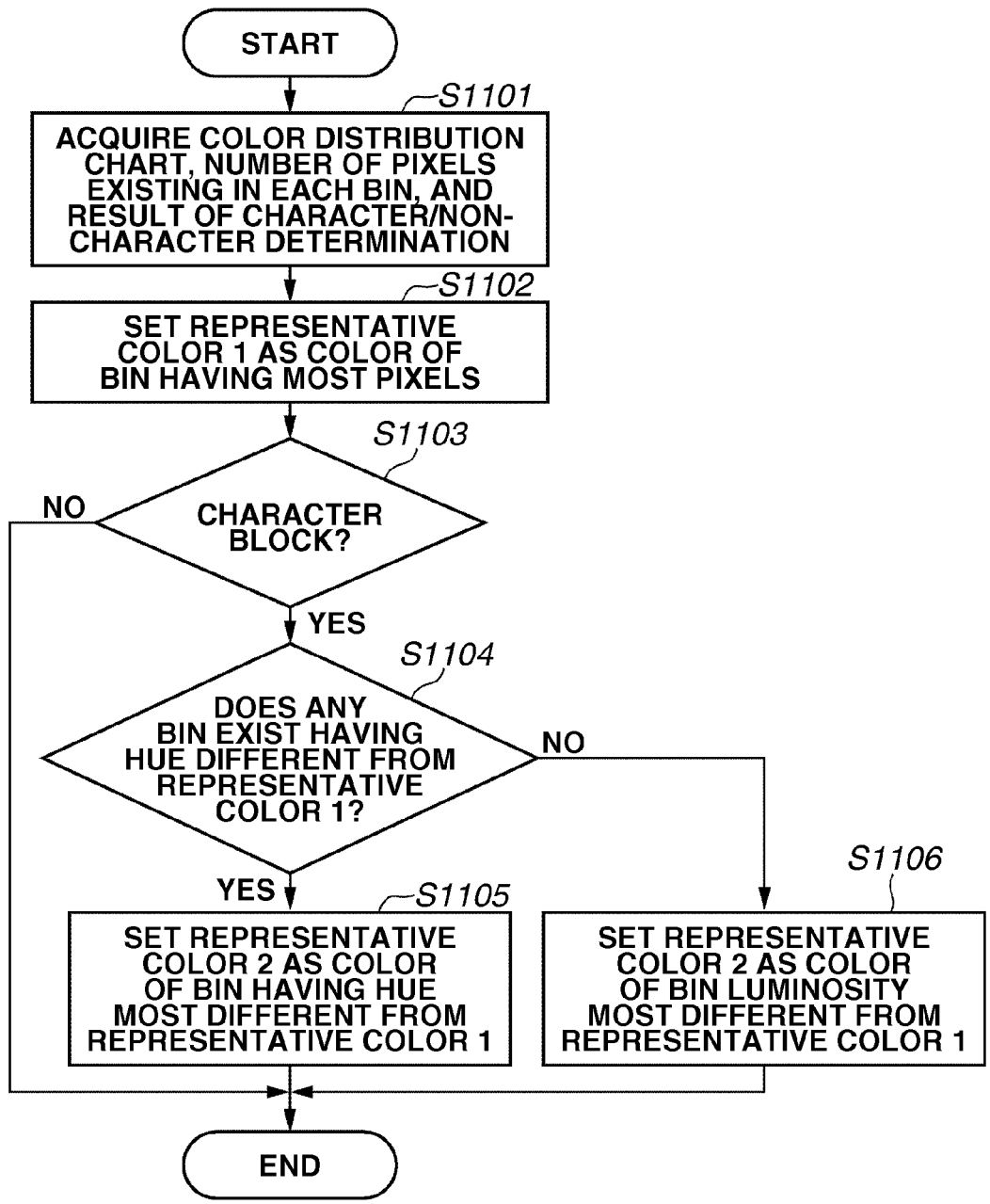

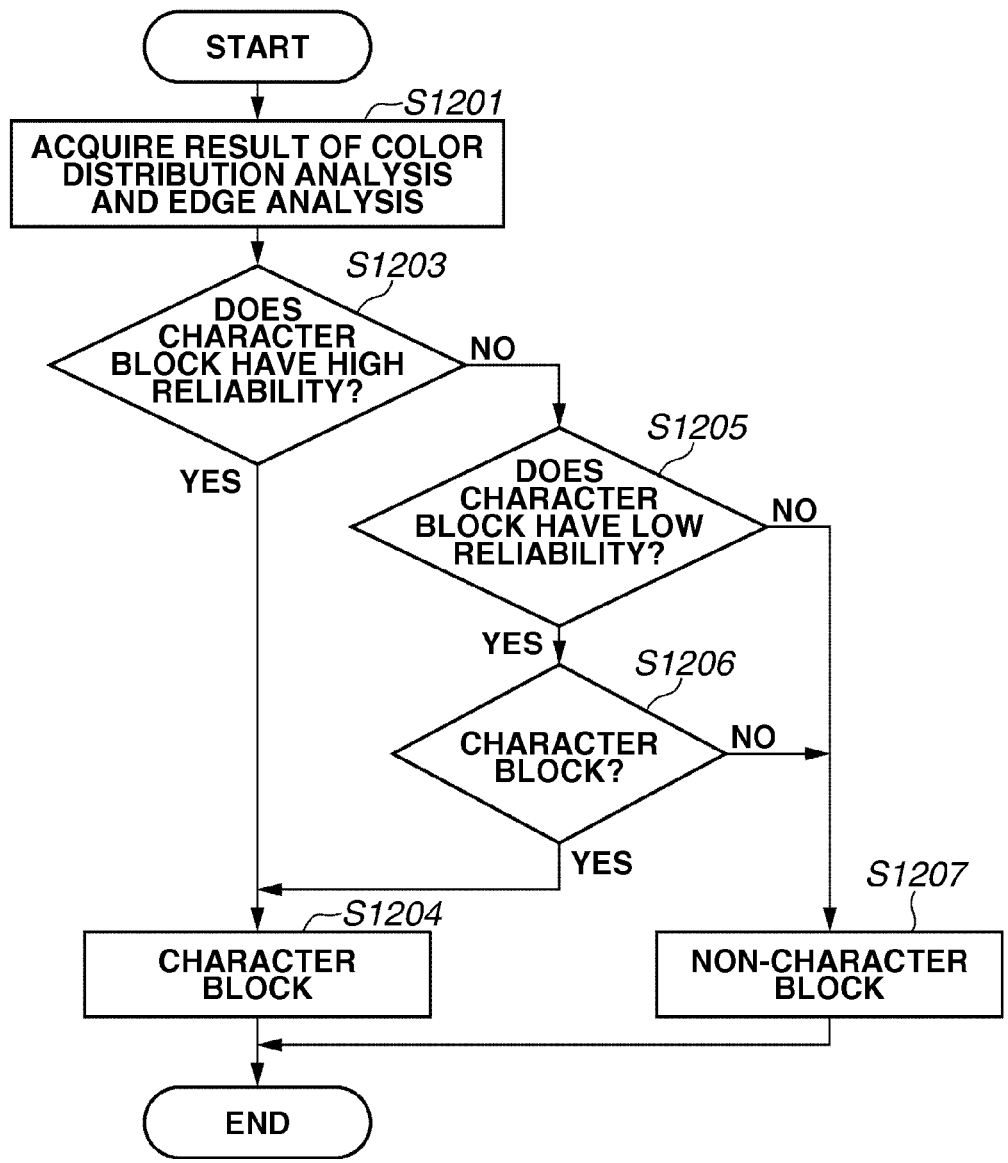

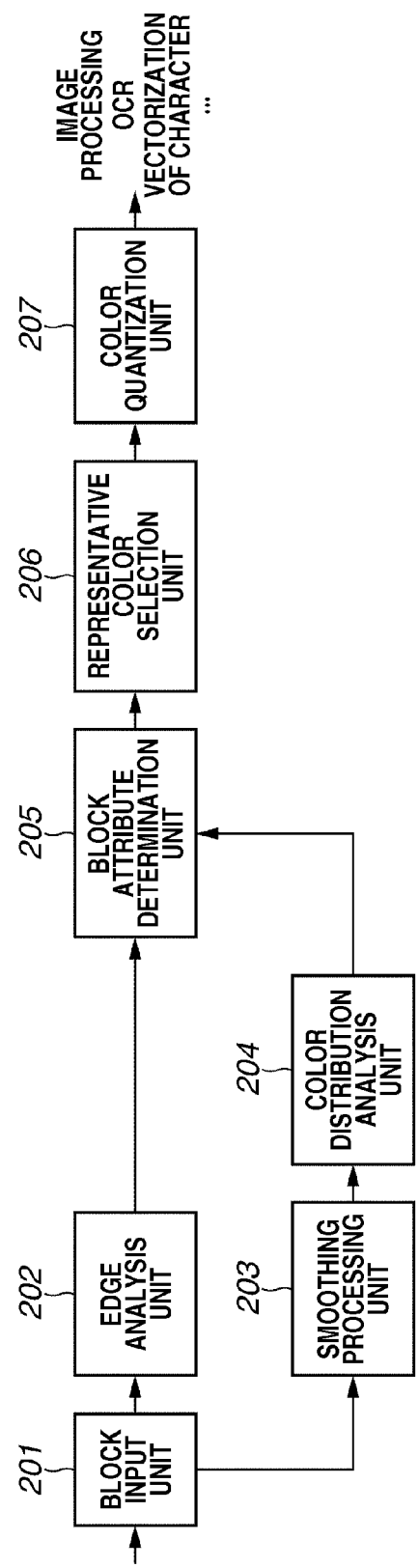

(1) CHARACTER ON
HALFTONE DOT WITH
LESS VISIBLE PATTERN (2) CHARACTER ON
HALFTONE DOT WITH
HIGHLY VISIBLE PATTERN

IMAGE PROCESSING APPARATUS, METHOD, AND STORAGE MEDIUM FOR DETERMINING ATTRIBUTES

BACKGROUND OF THE INVENTION

1. Field of the Invention

The present invention relates to an image processing apparatus, an image processing method, a program thereof and a storage medium for storing the program.

2. Description of the Related Art

In general, documents to be read in a digital multifunction peripheral or the like are mainly classified into three types, that is, character documents, photographic documents, and halftone dot printed documents. A halftone dot printed document is a document on which an image having gradations is decomposed into fine dot aggregates so that the gradations are represented in a simulated manner by the size of dots per unit area, that is, an average concentration per unit area.

If such a document, or a mixed document of these is scanned, characters, halftone dots, photographs, etc., are identified, and processes suitable for the respective regions are performed. On the character region, a process that puts an emphasis on the resolution is performed so that character recognition and character vectorization processes are executed. On the halftone dot and photographic regions, a process that puts an emphasis on the gradation is performed to improve its image quality. For this reason, it is generally necessary that characters, halftone dots, and the like can be identified with high precision.

Japanese Patent Application Laid-Open No. 5-328143 has discussed a method in which characters, halftone dots, and the like are systematically identified by using a determination based on color information of a document image and a determination based on edge information. Japanese Patent Application Laid-Open No. 5-328143 has discussed a process in which a document image is divided into blocks, each composed of a predetermined number of pixels, and determinations are respectively made thereon as to whether any edge exists in the block and as to whether any restricted color exists in the block. Moreover, in the processing method of Japanese Patent Application Laid-Open No. 5-328143, a block in which any edge exists and any restricted color also exists is determined as a character block, and the other blocks are determined as non-character blocks.

In the determination method discussed in Japanese Patent Application Laid-Open No. 5-328143, however, since both of a determination as to characters or halftone dots based on color information and that based on edge information are combined with each other to perform the determination, an erroneous determination tends to occur in the attribute of a region if the determination result of a region based on the color information and the determination result of the attribute of a region based on the edge information are different from each other. As a result, it is not possible to perform appropriate image processing, with the result that the image quality of the processed image deteriorates to cause broken characters.

SUMMARY OF THE INVENTION

According to an aspect of the present invention, an image processing apparatus capable of dividing a document image into block images, each including a predetermined number of pixels, and determining whether an attribute of each of the divided block images is a character includes a smoothing unit configured to smooth each block image to generate a smoothed block image, a color distribution acquiring unit configured to acquire a color distribution characteristic amount of the smoothed block image, an edge acquiring unit configured to acquire an edge characteristic amount of each block image, a color distribution determination unit configured to determine whether the attribute of each block image is a character based on the color distribution characteristic amount acquired by the color distribution acquiring unit, an edge determination unit configured to determine whether the attribute of each block image is a character based on the edge characteristic amount acquired by the edge acquiring unit, and a determination unit configured, if the color distribution determination unit determines with high reliability that the attribute of a particular block image is a character, to determine the attribute of the particular block image is a character, and if the color distribution determination unit determines with not high reliability that the attribute of the particular block image is a character, to determine the attribute of the particular block image as a determination result by the edge determination unit.

According to the present invention, it is possible to improve precision of a determination of the attribute of a block image in which a plurality of determination references is used.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

Each of FIGS. 6A to 6D illustrates one example of a color distribution chart of the character block with high reliability according to the first exemplary embodiment.

Figure 7:
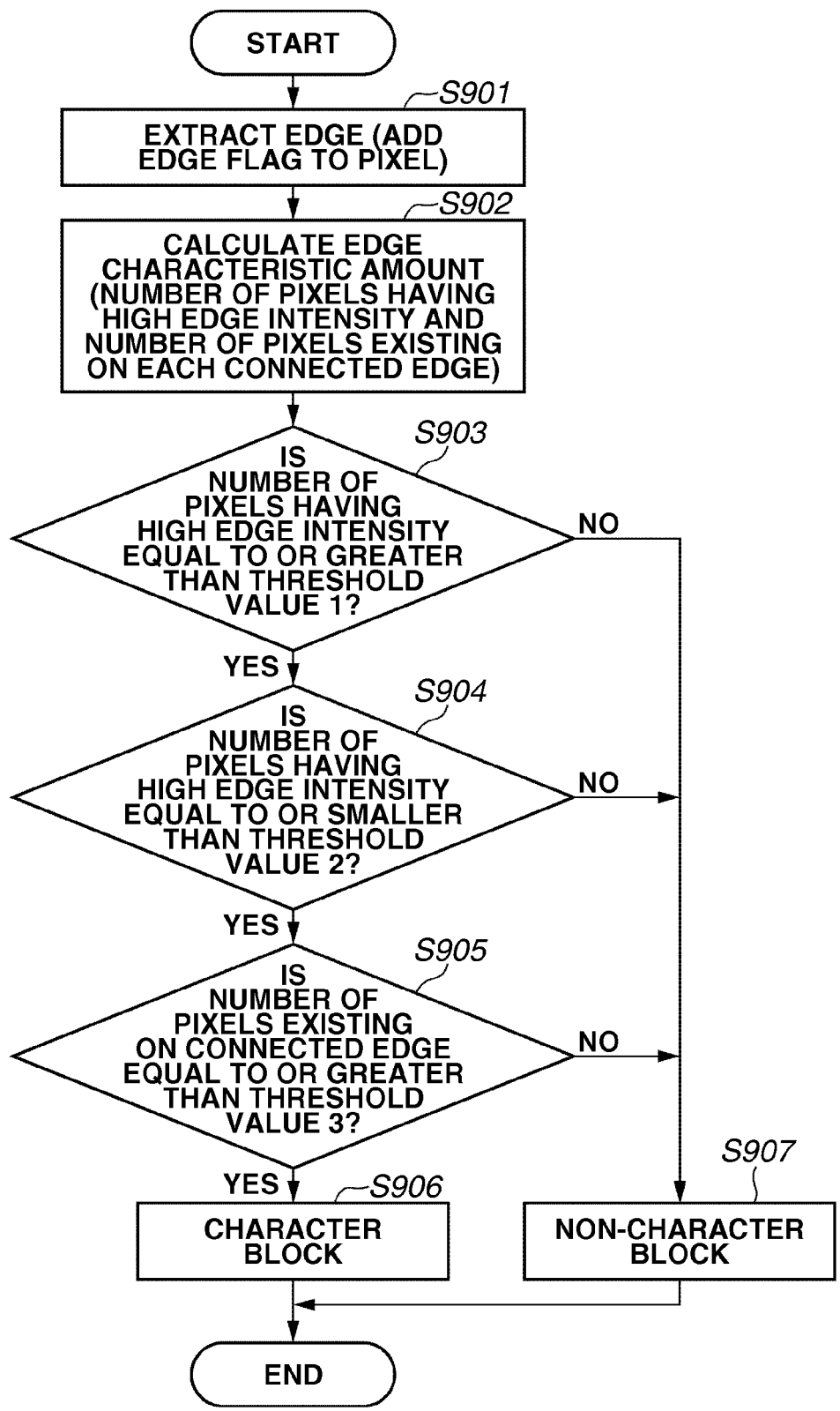

FIG. 7 is a flow chart that illustrates a character-block determination process to be performed based on edge information according to the first exemplary embodiment.

Figure 8A:
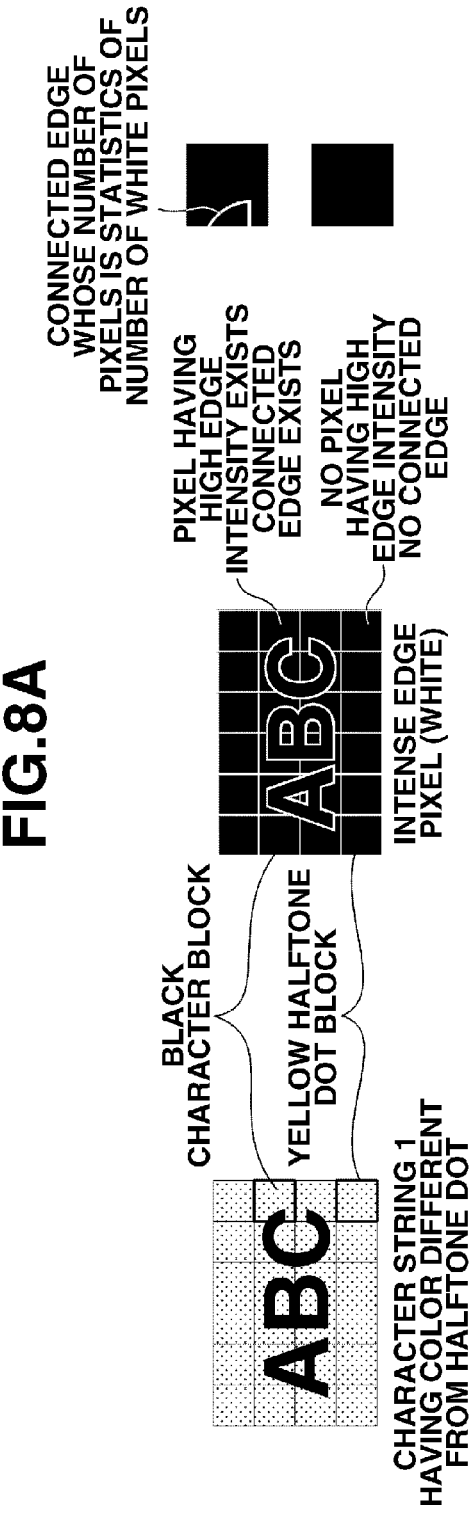
Figure 8B:
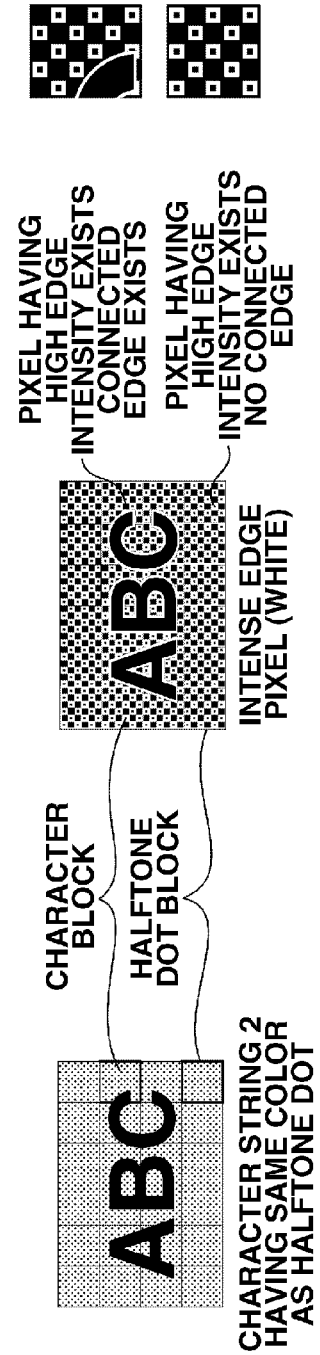

Each of FIGS. 8A and 8B illustrates one example of an edge characteristic between a character block and a halftone dot block according to the first exemplary embodiment.

FIG. 9 is a flow chart that illustrates a representative color selecting process according to the first exemplary embodiment.

FIG. 10 is a flow chart that illustrates a determination process of a block attribute according to a second exemplary embodiment.

FIG. 11 is a block diagram that illustrates a functional configuration of an image processing apparatus according to the second exemplary embodiment.

Figure 12:
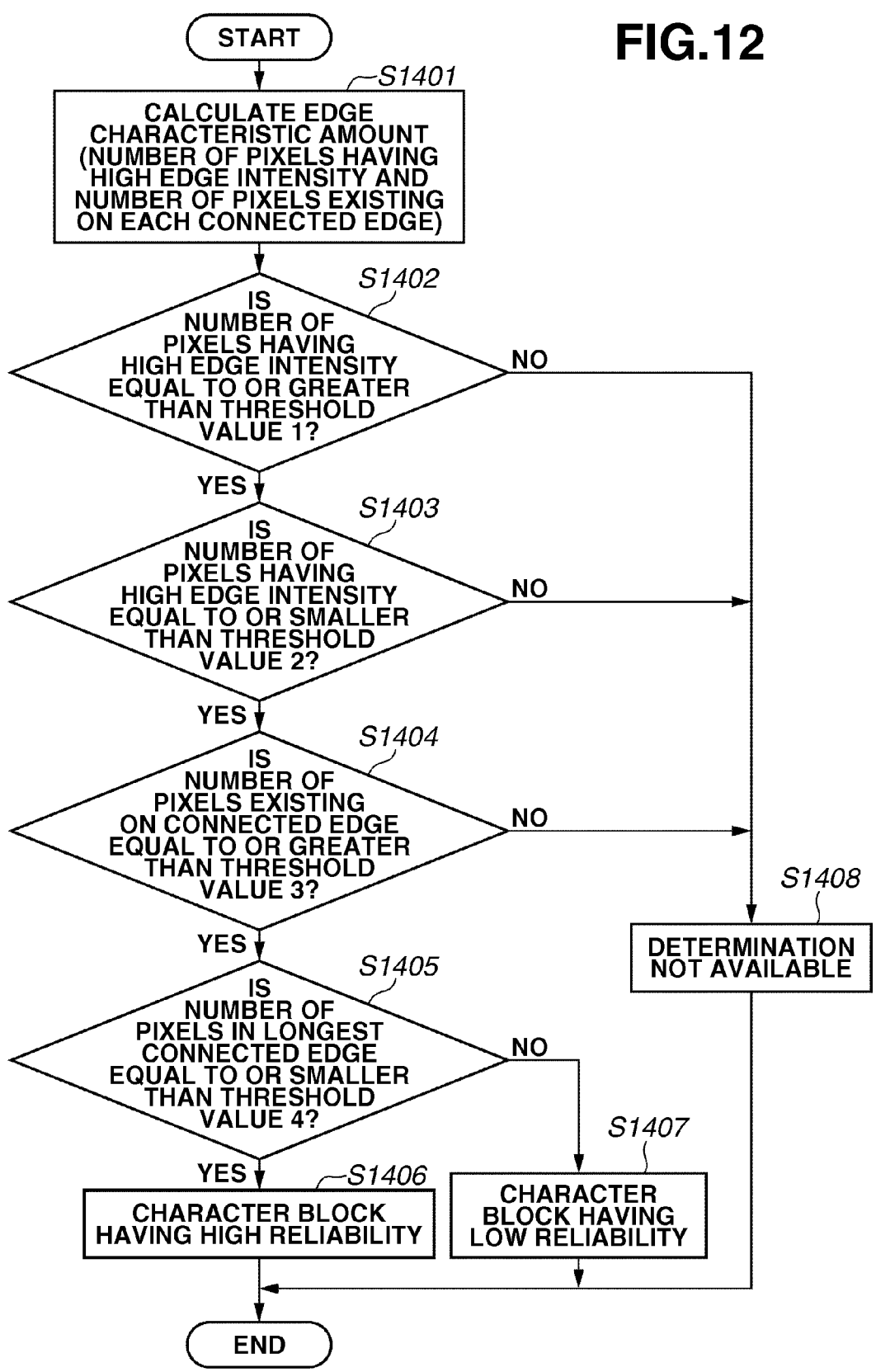

FIG. 12 is a flow chart that illustrates a character-block determination process with high reliability to be performed based on edge information according to the second exemplary embodiment.

Figure 13A:
Figure 13B:
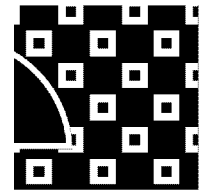

Each of FIGS. 13A and 13B illustrates one example of an edge characteristic of a character block with high reliability according to the second exemplary embodiment.

Figure 14:
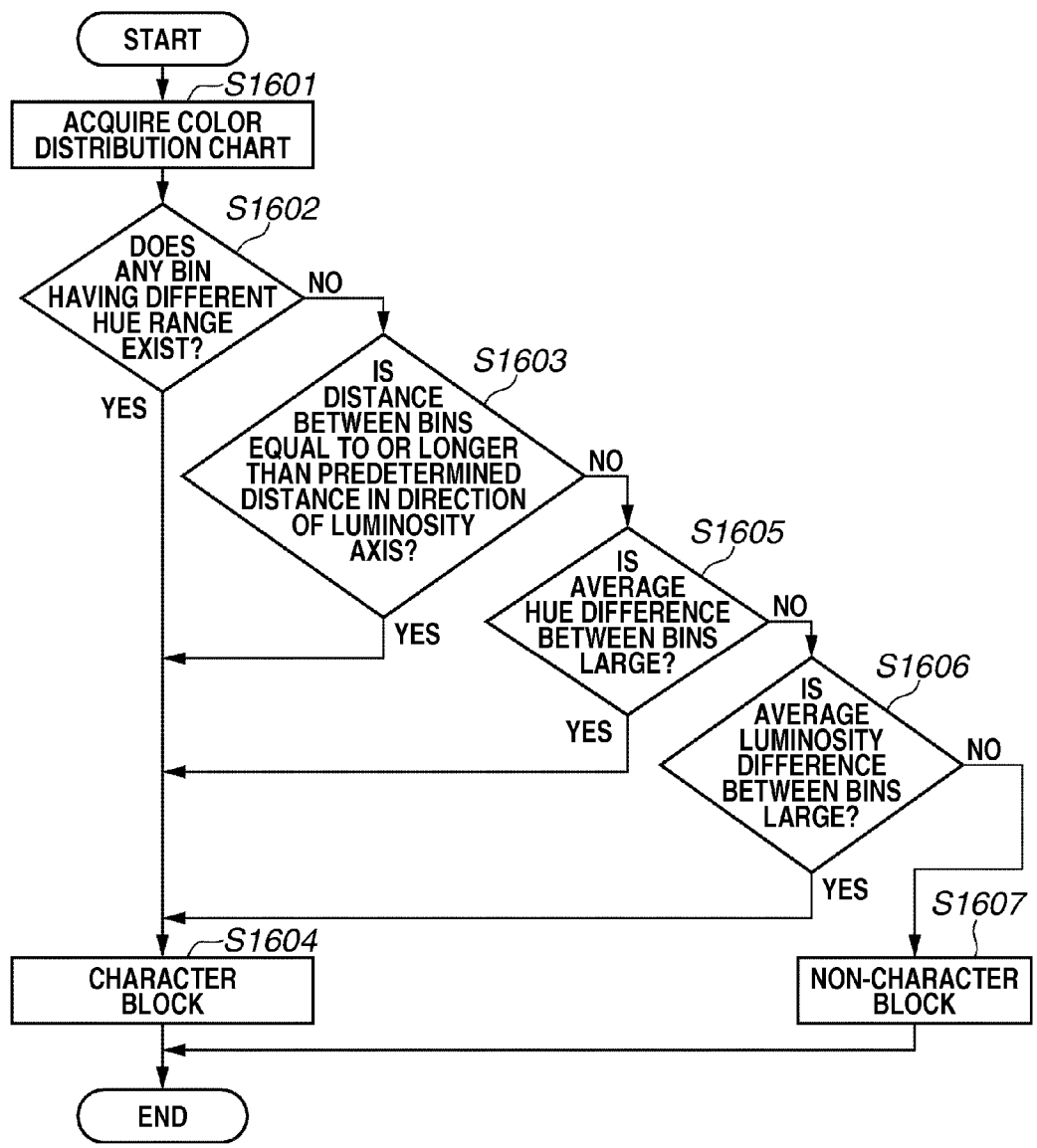

FIG. 14 is a flow chart that illustrates a character-block determination process to be performed based on color distribution information according to a third exemplary embodiment.

Figure 15:
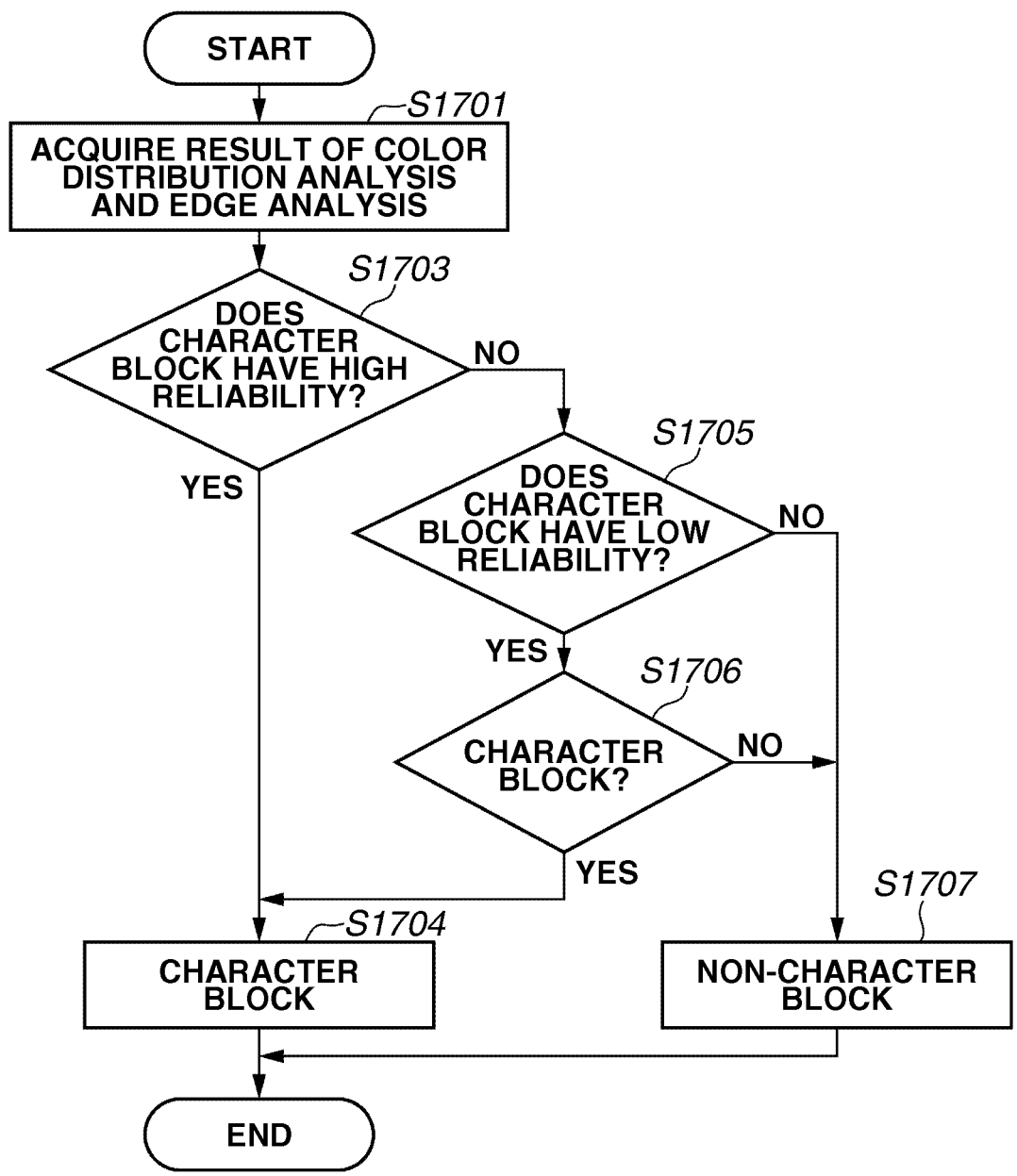

FIG. 15 is a flow chart that illustrates a block-attribute determination process according to a fourth exemplary embodiment.

Figure 16:
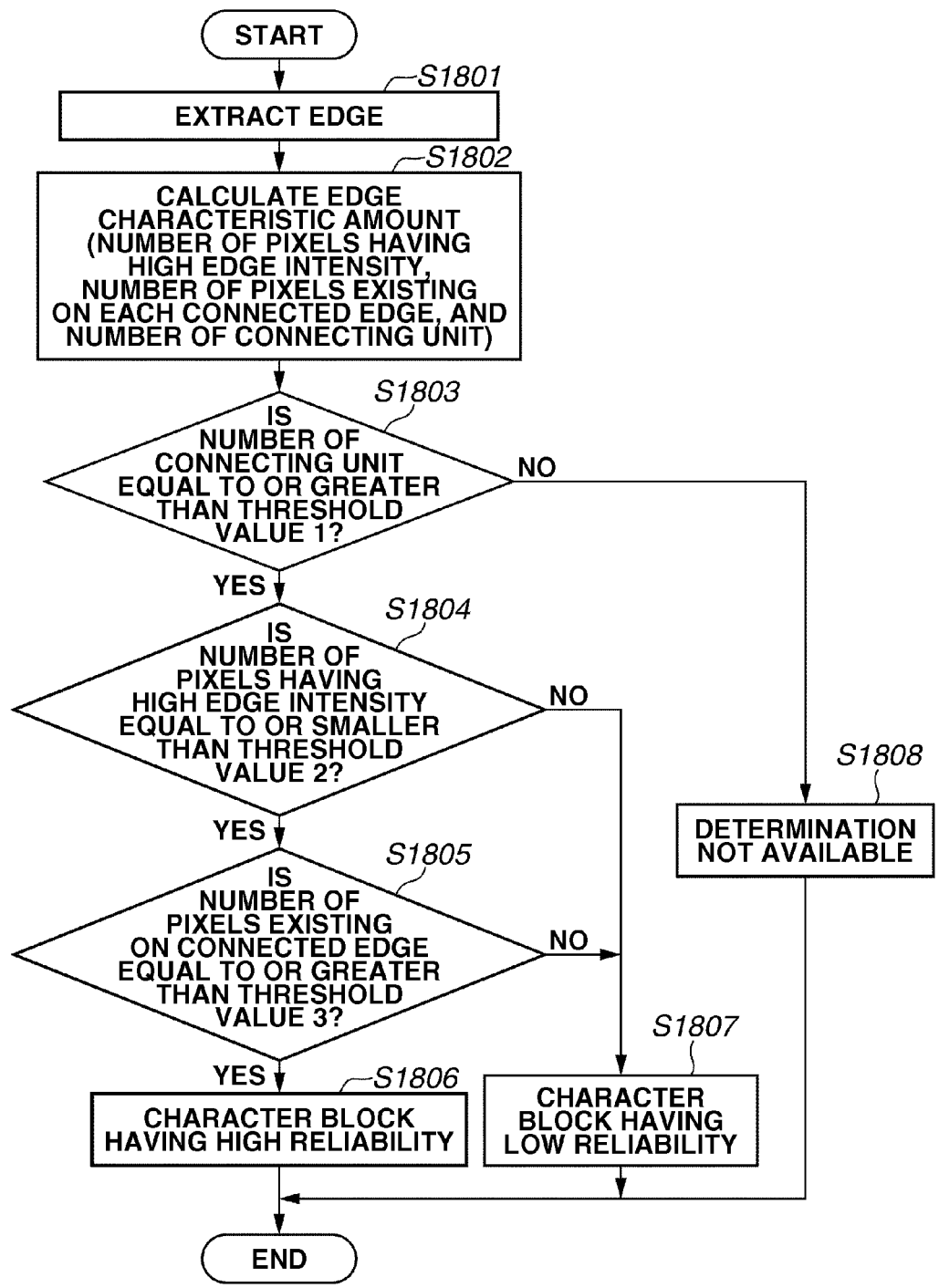

FIG. 16 is a flow chart that illustrates a halftone dot-block determination process with high reliability to be performed based on edge information according to a fifth exemplary embodiment.

DESCRIPTION OF THE EMBODIMENTS

Various exemplary embodiments, features, and aspects of the invention will be described in detail below with reference to the drawings.

Determination processes using an image processing apparatus according to the exemplary embodiments of the present invention are described below with reference to the drawings. Components described in these exemplary embodiments are exemplary only, and the technical scope of the present invention is not intended to be limited by the following individual exemplary embodiments.

Figure 1:
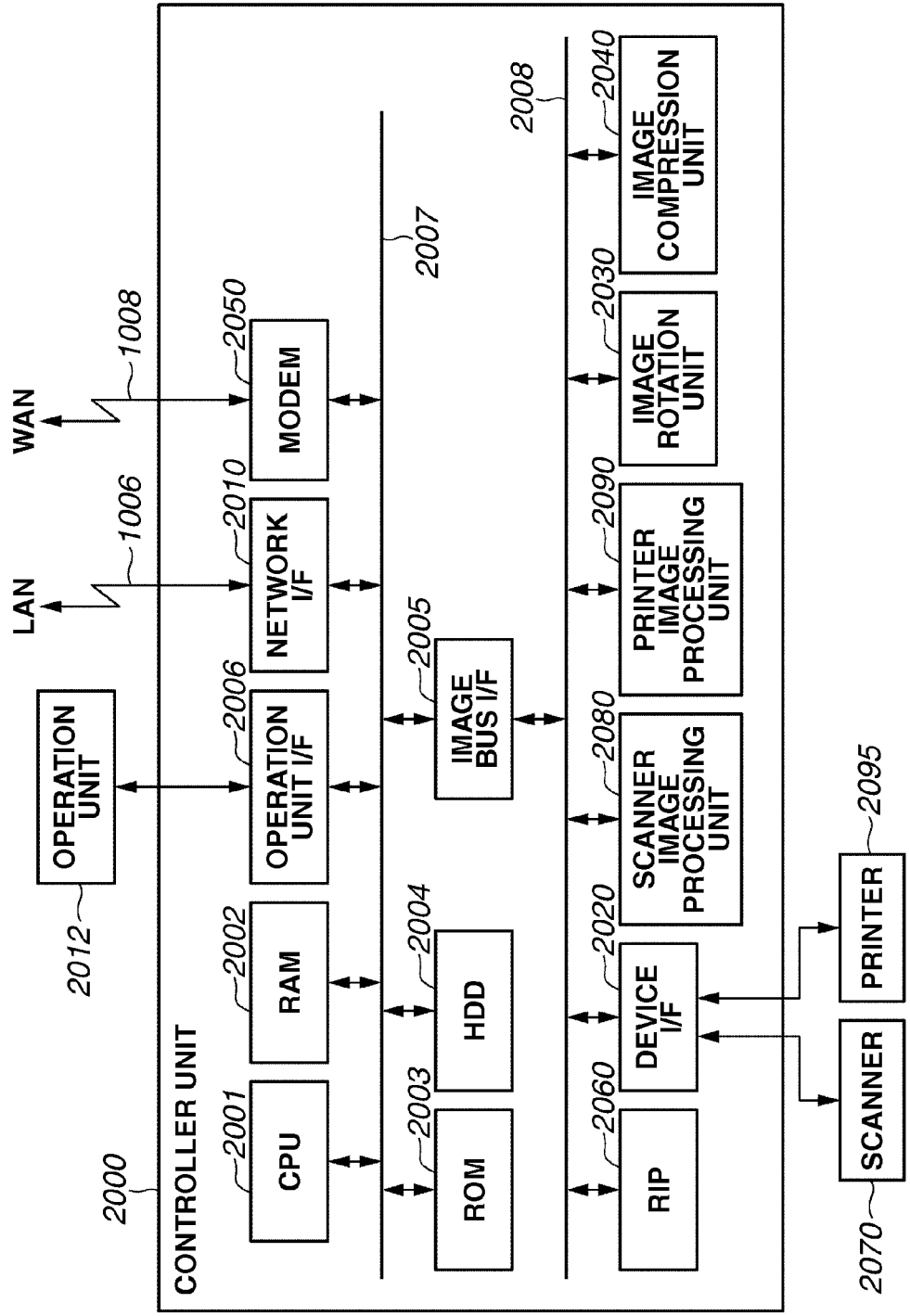
FIG. 1 is a block diagram that illustrates a main configuration of a digital multifunction peripheral (MFP) according to the present invention.

FIG. 1 is a block diagram that illustrates a main configuration of a digital multifunction peripheral (MFP) according to the present invention. In a first exemplary embodiment, the digital MFP having a scanner function and a printer function is used as an image processing apparatus. However, a system in which a general-purpose scanner and a personal computer are connected to each other may be used as the image processing apparatus.

As illustrated in FIG. 1, the MFP is provided with a controller unit 2000 that functions as a control unit for the image processing apparatus. The controller unit 2000 is connected with a scanner 2070 serving as an image input device and a printer 2095 serving as an image output device, via a device interface (I/F).

Moreover, the controller unit 2000 can perform a control process to allow the printer 2095 to implement a copy function, more specifically, to print and output image data that is read from a document image by the scanner 2070. The controller unit 2000 can also perform such a control process as to input and output image data, device information, and the like to and from another apparatus via a local area network (LAN) 1006, or a public line, i.e. a wide area network (WAN) 1008.

As illustrated in FIG. 1, the controller unit 2000 includes a central processing unit (CPU) 2001. The CPU 2001 activates an operation system (OS) by a boot program stored in a read only memory (ROM) 2003. By executing an application program stored in a hard disk drive (HDD) 2004 on the OS, the CPU 2001 performs various kinds of processes.

A random access memory (RAM) 2002 is used as a work area for the CPU 2001. The RAM 2002 also provides not only the work area for the CPU 2001, but also an image memory area for use in temporarily storing image data. The HDD 2004 stores the application program and the image data.

The respective processing units from a block input unit 101 to a color quantization unit 107 in FIG. 2, which are described below, are realized by the CPU 2001 when it reads out the application program preliminarily stored in the HDD 2004, loads the program in the RAM 2002, and develops as well as executes the program. Moreover, when the application programs are executed by the CPU 2001, processes illustrated in flow charts of FIGS. 3, 5, 7, 9, 10, 12 and 14-16 can be realized.

The ROM 2003 and RAM 2002 are connected to the CPU 2001 via a system bus 2007. To the CPU 2001, an operation unit interface (I/F) 2006, a network interface (I/F) 2010, a modem 2050, and an image bus interface (I/F) 2005 are connected.

The operation unit I/F 2006 serves as an interface relative to an operation unit 2012 including a touch panel and outputs image data to be displayed on the operation unit 2012 to the operation unit 2012. Moreover, the operation unit I/F 2006 transmits to the CPU 2001 information input to the operation unit 2012 by a user.

The network I/F 2010 is connected to the LAN 1006, and inputs/outputs information to or from the respective apparatuses connected to the LAN 1006 via the LAN 1006. The modem 2050 is connected to the public line 1008, and inputs/outputs information to and from another apparatus via the public line 1008.

The image bus I/F 2005 is a bus bridge that connects the system bus 2007 to an image bus 2008 that transfers image data at high speeds to transform a data structure. The image bus 2008 may include a peripheral component interconnect (PCI) bus or an Institute of Electrical and Electronic Engineers (IEEE) 1394 bus. Onto the image bus 2008, a raster image processor (RIP) 2060, a device I/F 2020, a scanner image processing unit 2080, a printer image processing unit 2090, an image rotation unit 2030, and image compression unit 2040 are installed.

The RIP 2060 is a hardware circuit that develops a page description language (PDL) code into a bit map image. The scanner 2070 and the printer 2095 are connected to the device I/F 2020 to perform a synchronous/asynchronous conversion of image data. The scanner image processing unit 2080 is a hardware circuit that performs correcting, modifying, and editing processes on input image data. The printer image processing unit 2090 is a hardware circuit that performs a printer correcting process, a resolution-converting process, and the like on print output image data. The image rotation unit 2030 is a hardware circuit that performs a rotation of image data. The image compression unit 2040 is a hardware circuit that compresses multi-valued image data into Joint Photographic Experts Group (JPEG) data and compresses binary image data into Joint Bi-level Image Experts Group (JBIG), Modified Modified Read (MMR) or Modified Huffman (MH) data, as well as performing expanding processes thereon.

The respective processing units, such as the RIP 2060, the scanner image processing unit 2080, the printer image processing unit 2090, the image rotation unit 2030, and the image compression unit 2040, described above, are constituted by hardware circuits. However, the CPU may be functioned as the respective processing units by allowing the CPU to execute programs that realize these functions. In this case, for example, a ROM for storing programs that realize these functions, a RAM for loading and developing the respective programs, and the CPU for executing the programs developed onto the RAM are installed into the controller unit 2000 in a separated manner.

Figure 2:
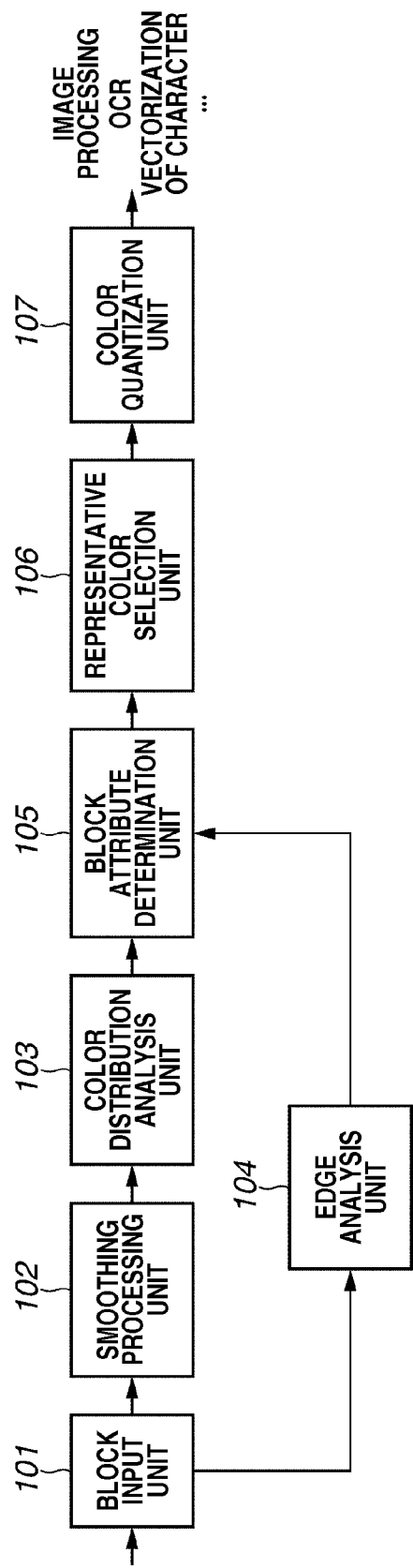
FIG. 2 is a block diagram that illustrates a functional configuration of an image processing apparatus according to a first exemplary embodiment of the present invention.

FIG. 2 is a block diagram that illustrates a configuration of the image processing apparatus according to the present exemplary embodiment of the present invention.

The block input unit 101 inputs image data (a document image), divided into block images each of which includes a predetermined number of pixels (for example, a block with 16×16 pixels) of an original image (also referred to as a document image) that has been read by an image reading unit, such as the scanner 2070, to a smoothing processing unit 102 and an edge analysis unit 104.

The smoothing processing unit 102 performs a smoothing process on each block image from the block input unit 101 so that a smoothed block image is generated. The smoothing processing unit 102 functions as a smoothing unit. The smoothing process is a process for reducing fine irregularities of respective pixels that exist in each block image to squash halftone dot patterns and consequently to easily perform an analysis of color information. The smoothing process can be realized by utilizing known filters, such as a low-pass filter, a moving average filter, an edge-preserving smoothing filter, and the like. The smoothing process can make it easier to analyze character colors of halftone characters and mixed ink color characters composed of halftone dots.

A color distribution analysis unit 103 analyzes a distribution of demonstrated colors of pixels of a block image (smoothed block image) after the smoothing process performed by the smoothing processing unit 102, and determines a block attribute. The color distribution analyzing process will be described below in detail with reference to FIG. 3.

The edge analysis unit 104 analyzes edge information of each block image transmitted from the block input unit 101 to determine a block attribute. The edge analyzing process will be described below in detail with reference to FIG. 7.

A block attribute determination unit 105 determines whether each block image is a character block or a non-character block based on the determination result as to the attribute of each block image of the color distribution analysis unit 103 and the edge analysis unit 104. If a particular block image of a processing target is determined by the color distribution analysis unit 103 as a character with high reliability, the block attribute determination unit 105 determines the particular block image as a character block. If the particular block image is not determined as a character with high reliability by the color distribution analysis unit 103, the block attribute determination unit 105 determines whether the particular block image of the processing target is a character block or a non-character block based on the determination result of the edge analysis unit 104.

In this case, the term "character block" does not necessarily restrict the attribute of a block image to a character. For example, when a graphic object (for example, a square object) is located in halftone dots, the attribute of such a block image as to include an edge portion of the graphic object is sometimes referred to as the character block. In other words, the character block refers to an attribute of a block image including an object (for example, a character or a graphic form) different from a halftone dot in halftone dots that may serve as a background.

A representative color selection unit 106 determines a main color of the block image based on the attribute determined by the block attribute determination unit 105. The representative color selecting process will be described below in detail with reference to FIG. 9.

The color quantization unit 107 determines a color to be assigned to each of pixels that exist in each block image based on the main color determined by the representative color selection unit 106. The color quantization process will be described below in detail with reference to FIG. 9.

By utilizing the results of the above-described processes up to the color quantization unit 107 performed based on the block image unit, it is possible to perform switching among image processing processes for each block image. For example, a character pixel of a character block can be edge-emphasized or pixels that exist in a non-character block can be smoothed. Further, by using the results of processes performed based on the block image unit and information among block images, it becomes possible to connect character pixels to one another, to separate them to each character unit, and to perform character recognition and character contour vectorization.

<Color Distribution Analyzing Process>

Figure 3:
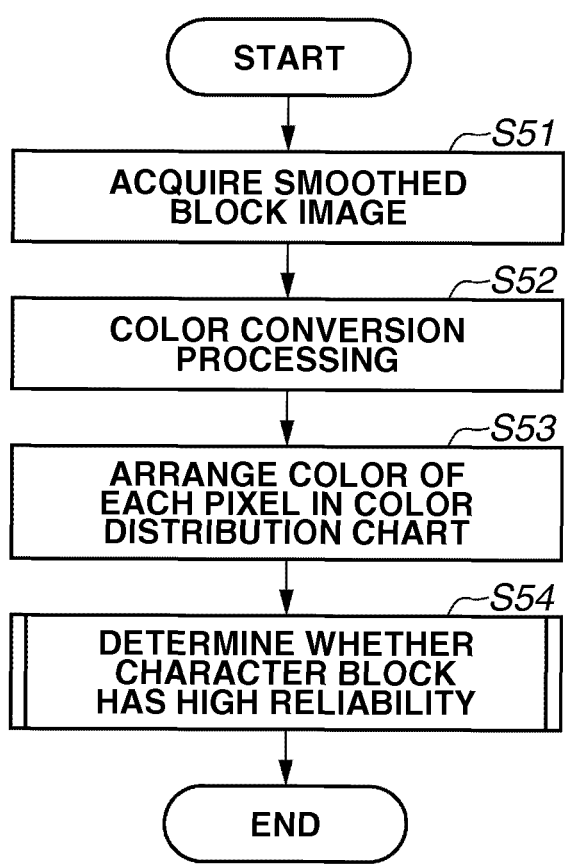
FIG. 3 is a flow chart that illustrates a character-block determination process to be performed based on color information according to the first exemplary embodiment.

Referring to FIG. 3, the determination process of a character block with high reliability by the color distribution analyzing process of the color distribution analysis unit 103 in the present exemplary embodiment will be described in detail below. The processes in steps S51 to S54 to be described below are realized by the CPU 2001 when it reads out an application program preliminarily stored in the HDD 2004, and loads the application program in the RAM 2002 where the program is developed and executed.

First, in step S51, the color distribution analysis unit 103 acquires a block image after the smoothing process (smoothed block image) output from the smoothing processing unit 102. In other words, the color distribution analysis unit 103 functions as a color distribution acquiring unit.

Next, in step S52, the color distribution analysis unit 103 converts the acquired block image from a red-green-blue (RGB) color space into a color space capable of demonstrating the luminosity and hue, such as a hue, saturation, and value (HSV) color space.

Next, in step S53, the color distribution analysis unit 103 arranges the luminosity value and the hue value of each of pixels existing in the block image after the smoothing process over a color distribution chart (color histogram) and obtain color information (color distribution characteristic amount). In other words, the color distribution analysis unit 103 functions as a color distribution acquiring unit.

Figure 4:
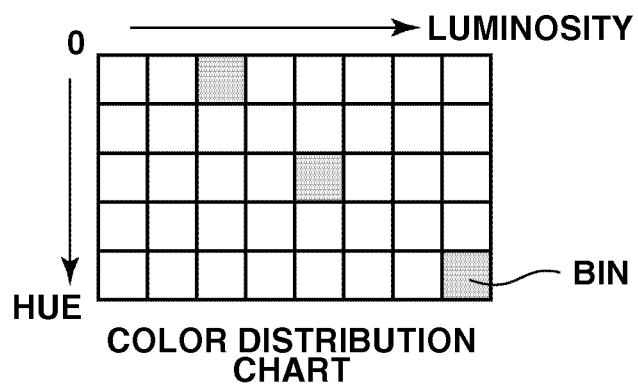
FIG. 4 illustrates one example of a color distribution chart according to the first exemplary embodiment.

FIG. 4 illustrates a two-dimensional color histogram that indicates one example of the color distribution. The luminosity value is plotted on the abscissa axis, and the hue value is plotted on the ordinate axis. A numeric value range which can be taken by the luminosity value and a numeric value range which can be taken by the hue value are respectively divided by M pieces and N pieces. In this example, M and N are 8 and 5 respectively. However, other values may be used as long as the color distribution is recognizable and as long as an appropriate granularity is provided for the character block determination in step S54 to be described below. Moreover, the color histogram may be obtained by dividing the respective numeric value ranges of hue and luminosity based on a division that is not the equal division.

Hereinafter, a range (range corresponding to each square frame in FIG. 4), obtained after dividing the color space in this manner, is referred to as a "bin". Each pixel to be arranged in each bin has the luminosity value and hue value within constant numeric value ranges corresponding to each bin. In the example in FIG. 4, pixels are disposed in the bin represented by a shaded portion, which indicates that the pixels disposed therein are included in the luminosity range and the hue range of the corresponding bin. By finding the color distribution in this manner, the luminosity range of each pixel in a block image, that is a difference in the luminosity, or the color range of each pixel, that is a difference in the hue, can be obtained.

Although the bin is defined to be formed by dividing the color space based on the numeric value ranges of luminosity and hue, the method for dividing the color space to obtain the color histogram is not limited by this method. For example, in the case of the HSV color space, the bin may be formed by using the saturation as well.

Next, in step S54, the color distribution analysis unit 103 determines whether the attribute of the block image of the processing target is that of a character block with high reliability based on the color information (color distribution characteristic amount). In other words, the color distribution analysis unit 103 functions as a color distribution determination unit.

Figure 5:
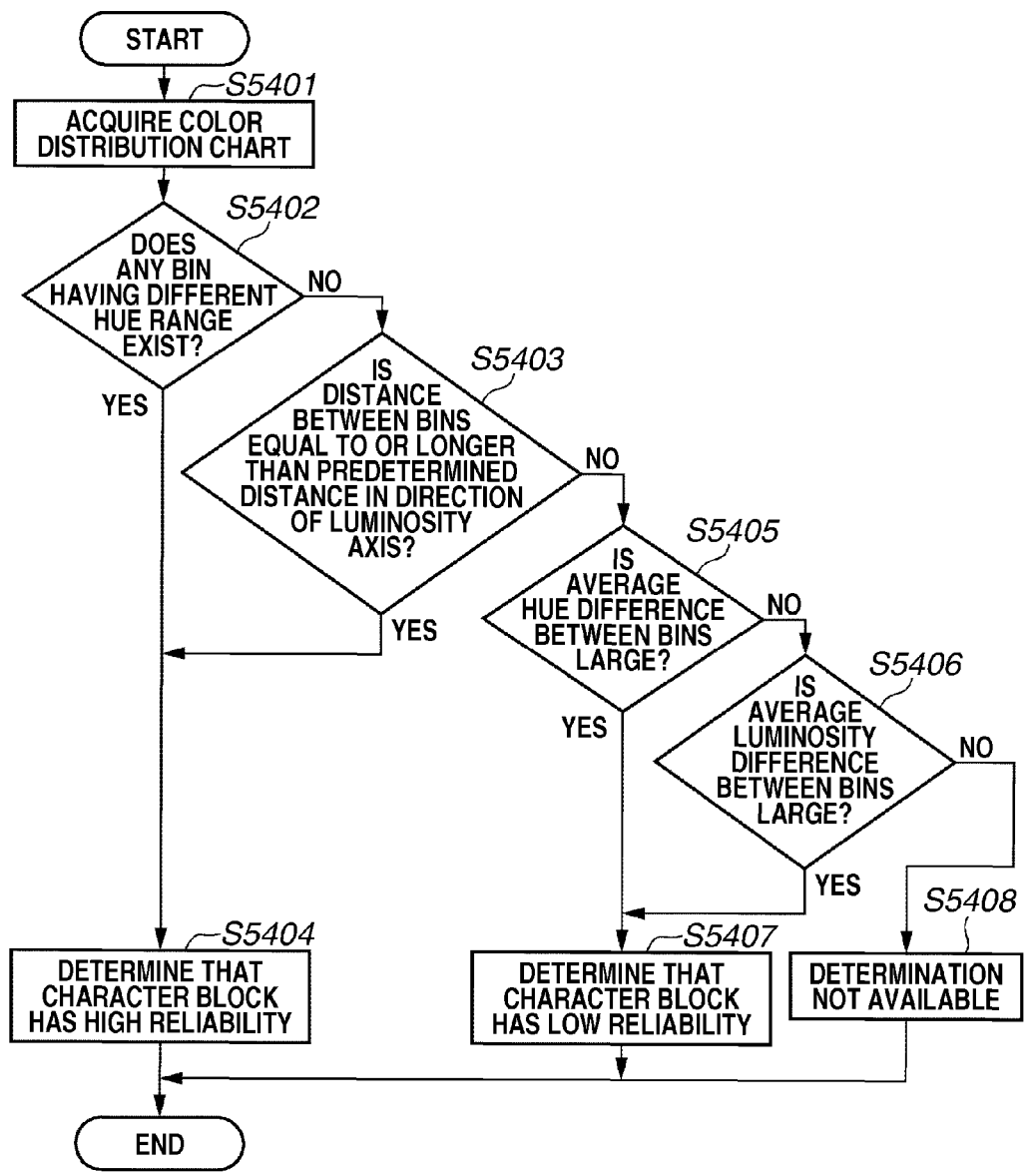
FIG. 5 is a flow chart that illustrates a character-block determination process with high reliability to be performed based on color information according to the first exemplary embodiment.

The character determining process is described below with reference to a flow chart in FIG. 5. The processes in steps S5401 to S5408 to be described below are realized by the CPU 2001 when it reads out an application program preliminarily stored in the HDD 2004, and loads the application program in the RAM 2002 where the program is developed and executed.

In step S5401, the color distribution analysis unit 103 acquires the color distribution chart of the block image as the processing target which is obtained in step S53. In step S5402, the color distribution analysis unit 103 determines whether there are any bins that have different ranges in the hue.

If it is determined that there are any bins that have different ranges in the hue (YES in step S5402), the processing proceeds to step S5404. In step S5404, the color distribution analysis unit 103 determines that the block image is a character block with high reliability. If it is not determined in step S5402 that there are bins in the two or more hue ranges (NO in step S5402), the processing proceeds to step S5403.

Next, in step S5403, the color distribution analysis unit 103 determines whether a distance between bins separated from each other is a predetermined distance or more in the luminosity axis direction of the color distribution chart obtained in step S53. If it is determined that the distance between the bins is the predetermined distance or more (YES in step S5403), the processing proceeds to step S5404. If it is not determined that the distance between the bins is the predetermined distance or more (NO in step S5403), the processing proceeds to step S5405.

In step S5405, the color distribution analysis unit 103 calculates an average hue value within each of the bins, and determines whether a difference between the respective average hue values is a predetermined hue difference threshold value or more. If it is determined that the difference between the average hue values is the predetermined hue difference threshold value or more (YES in step S5405), the processing proceeds to step S5407. If it is not determined that the difference between the average hue values is the predetermined hue difference threshold value or more (NO in step S5405), the processing proceeds to step S5406. In step S5407, the color distribution analysis unit 103 determines that the block image is a character block with low reliability.

In step S5406, the color distribution analysis unit 103 calculates an average luminosity value within each of the bins, and determines whether a difference between the respective average luminosity values is a predetermined luminosity difference threshold value or more. If it is determined that the difference between the average luminosity values is the predetermined luminosity difference threshold value or more (YES in step S5406), the processing proceeds to step S5407.

If it is not determined that the difference between the average luminosity values is the predetermined luminosity difference threshold value or more (NO in step S5406), the processing proceeds to step S5408. In step S5408, the color distribution analysis unit 103 determines that the block image of the processing target is a determination incapable block. That is, the determination incapable block means unreliable determination block, which is neither a character block with high reliability nor a character block with low reliability.

Figure 6A:
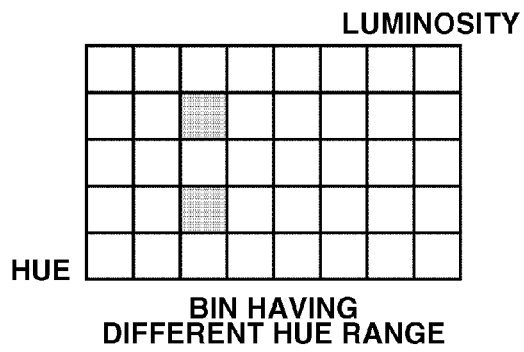

Example of Character Block Determination by Color Distribution Analyzing Process FIGS. 6A to 6D illustrate examples of character block determination by the color distribution analyzing process according to the first exemplary embodiment. FIG. 6A illustrates a color distribution chart obtained when the determination result in step S5402 corresponds to "Yes". The color distribution chart in FIG. 6A is a color distribution chart that includes bins having different ranges in the hue, and indicates an example in which the hues of halftone dot pixels and character pixels are different from each other.

Figure 6B:
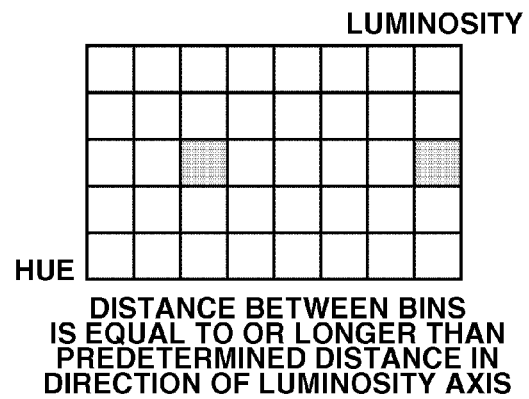

FIG. 6B illustrates a color distribution chart obtained when the determination result in step S5403 corresponds to "Yes". The color distribution chart in FIG. 6B is a color distribution chart if a distance between bins is a predetermined distance or more in the luminosity axis direction. Further, in the color distribution chart, although no difference is found in the hue between halftone dot pixels and character pixels (located in the same hue range), there is a great difference in the luminosity between the halftone dot pixels and character pixels.

Figure 6C:
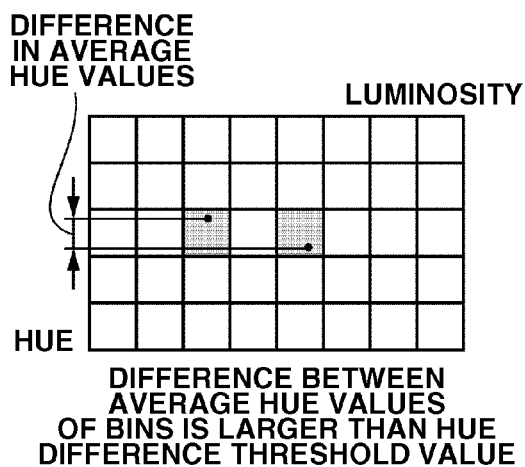

FIG. 6C illustrates a color distribution chart obtained when the determination result in step S5405 corresponds to "Yes". The color distribution chart in FIG. 6C is a color distribution in which two bins have equal to each other in the hue ranges and the distance between these bins in the luminosity axis direction is shorter than the predetermined distance, however, the difference in average hue values of the respective bins is greater than a predetermined hue difference threshold value.

Figure 6D:
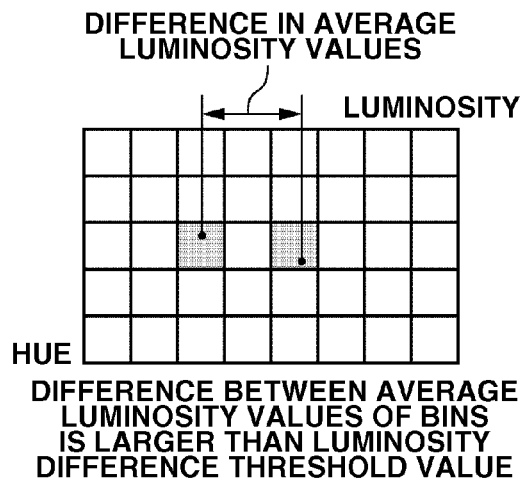

FIG. 6D illustrates a color distribution chart obtained when the determination result in step S5406 corresponds to "Yes". The color distribution chart in FIG. 6D is a color distribution chart in which two bins have equal to each other in the hue ranges, the distance between these bins in the luminosity axis direction is shorter than the predetermined distance, and the difference in average hue values of the respective bins is the predetermined hue difference threshold value or less, however, the difference in average luminosity values in the respective bins is greater than the predetermined luminosity difference threshold value.

A block image having each of the color distribution charts as illustrated in FIGS. 6A and 6B is a character block with high reliability, and its attribute of the block image can be determined only by the determination result by the color distribution analyzing process. A block image having each of the color distribution charts as illustrated in FIGS. 6C and 6C is a character block with low reliability, and its attribute of the block image is not determined only by the determination result by the color distribution analyzing process. Its attribute of the block image needs to be determined by also utilizing the determination result of an edge analyzing process to be described below.

As described above, an erroneous determination tends to occur in regions in which a determination as to whether the block image is a character or a halftone dot is hardly made by using only the color information, in particular, in a character region having a color (luminosity and hue) close to that of a halftone dot. Consequently, in the present exemplary embodiment, any block (character block with high reliability) that can be determined as a character block by using the color information is determined as a character, and any block (character block with low reliability and a determination incapable block) that is hardly determined as to whether the block image is a character block or a halftone dot block by using the color information is determined by further performing the edge analyzing process.

Moreover, as described above, in the case of a character region located on halftone dots with low luminosity and high density, a determination as to whether the block image is a character or a halftone dot is hardly made only by using the edge information. However, since colors are different between the character and the halftone dot, the determination can be made as being a character block based on the color information.

<Edge Analyzing Process>

A determination process as to a character block or a non-character block by the use of the edge analyzing process is based on characteristics that there are some pixels having a high edge intensity to a certain degree in a character region and that the pixels with the high edge intensity are connected to one another to a certain degree. The determination process according to the first exemplary embodiment will be described in detail below with reference to FIG. 7. Processes in steps S901 to S907 to be described below are realized by the CPU 2001 when it reads out an application program preliminarily stored in the HDD 2004 and loads the program in the RAM 2002 where the program is developed and executed. These processes are performed by the edge analysis unit 104.

First, in step S901, the edge analysis unit 104 extracts an edge from a block image output by the block input unit 101. The edge extraction can be realized by utilizing a known filter, such as a Prewitt filter, in a process for generating differential data indicating the edge intensity. In order to acquire characteristics that make it possible to distinguish between a halftone dot and a character based on an edge distribution state, a block image prior to the halftone dot squashing process (smoothing process) is used for the edge extraction.

Next, in step S902, the edge analysis unit 104 calculates an edge characteristic amount of the block image to obtain the edge characteristic amount. In other words, the edge analysis unit 104 functions as an edge acquiring unit. In this case, the number of pixels with the high edge intensity and the number of connected edge pixels are calculated as the edge characteristic amounts.

The number of pixels with the high edge intensity is a characteristic amount that indicates how many pixels having the high edge intensity are included within a block image, and obtained by counting the number of edge pixels having a predetermined edge intensity threshold value or more. The number of the connected edge pixels is a characteristic amount that indicates to what extent the pixels having the high edge intensity are connected, and obtained by counting the number of pixels having the high edge intensity which are mutually adjacent to one another and connected. In this case, the number of the connected edge pixels is calculated for each of connecting units of the edge pixels.

Next, in steps S903 to S907, based on the edge characteristic amounts, the edge analysis unit 104 determines whether the attribute of the block image is that of a character block or a non-character block. In other words, the edge analysis unit 104 functions as an edge determination unit.

In step S903, the edge analysis unit 104 determines whether the number of pixels having the high edge intensity is a predetermined threshold value 1 or more. If it is determined that the number of pixels having the high edge intensity is not the predetermined threshold value 1 or more (NO in step S903), the processing proceeds to step S907. In step S907, the edge analysis unit 104 determines that the block image is a non-character block.

If it is determined that the number of pixels having the high edge intensity is the predetermined threshold value 1 or more (YES in step S903), the processing proceeds to step S904. Since a halftone dot region having a pattern with weak edge intensity is characterized in that there are very few pixels having the high edge intensity, the threshold value 1 is set to a low numeric value.

In step S904, the edge analysis unit 104 determines whether the number of pixels having the high edge intensity is a predetermined threshold value 2 or less. If it is determined that the number of pixels having the high edge intensity is not the predetermined threshold value 2 or less (NO in step S904), the processing proceeds to step S907. In step S907, the edge analysis unit 104 determines that the block image is the non-character block.

If it is determined that the number of pixels having the high edge intensity is the predetermined threshold value 2 or less (YES in step S904), the processing proceeds to step S905. Since a halftone dot region having a pattern with the high edge intensity is characterized in that there are great many pixels having the high edge intensity, the threshold value 2 is set to a high numeric value.

In step S905, the edge analysis unit 104 determines whether the number of the connected edge pixels is a predetermined threshold value 3 or more. If the number of the connected edge pixels is the predetermined threshold value 3 or more (YES in step S905), then in step S906, the edge analysis unit 104 determines that the block image of the processing target is a character block. On the other hand, if the number of the connected edge pixels is not the predetermined threshold value 3 or more (NO in step S905), then in step S907, the edge analysis unit 104 determines that the block image of the processing target is the non-character block. In this case, since the characteristic that edges having the high intensity are adjacent to one another and connected in some degree in a character portion is utilized, the threshold value 3 is set to an intermediate numeric value.

Example of Edge Analyzing Process

FIGS. 8A and 8B illustrate examples of edge characteristic of a halftone dot region and a character region in the image processing according to the first exemplary embodiment. In the case of a character example 1 having a color different from that of the halftone dot as illustrated in FIG. 8A, a large number of pixels with the high edge intensity exist in a character block (black character block) in which the edge pixels are continuous. In contrast, no pixels having the high edge intensity exist in a halftone dot block (yellow halftone dot block). Depending on a halftone dot density, a halftone dot color, and a character color, halftone dot blocks having many pixels with the high edge intensity also exist. However, since the number of connected edge pixels is small in the halftone dot block, the character block and the halftone dot block can be distinguished from each other based on a difference in the edge characteristic.

In the case of a character example 2 having the same color as that of the halftone dot as illustrated in FIG. 8B, pixels having the high edge intensity exist in a halftone dot block to the same extent as that of a character block. However, in contrast to edge pixels in the character block some of which are continuous, the number of continuous edge pixels in the halftone dot block is small. Accordingly, the character block and the halftone dot block that are not distinguished by the color distribution can be distinguished by the edge analysis.

<Block Attribute Determination>

A block attribute determining process according to the first exemplary embodiment will be described below in detail.

When the attribute of the block image is determined as the character with high reliability in the color distribution analyzing process by the color distribution analysis unit 103, the block attribute determination unit 105 determines the attribute of the block image as the character block.

If the attribute of the block image is not determined as the character block with high reliability in the color distribution analyzing process by the color distribution analysis unit 103, the block attribute determination unit 105 determines whether the block image is the character block or not based on the result of determination by the edge analyzing process by the edge analysis unit 104.

At this time, if the attribute of the block image is determined as the character block by the edge analyzing process by the edge analysis unit 104, the block attribute determination unit 105 determines the attribute of the block image as the character block. Moreover, if the attribute of the block image is determined as the non-character block by the edge analyzing process by the edge analysis unit 104, the block attribute determination unit 105 determines the attribute of the block image as the non-character block. In other words, the block attribute determination unit 105 functions as a determination unit.

<Representative Color Selection and Color Quantization>

A representative color selecting process by the representative color selection unit 106 according to the first exemplary embodiment will be described in detail below with reference to FIG. 9. A processing flow in steps S1101 to S1106 to be described below is realized by the CPU 2001 when it reads out an application program preliminarily stored in the HDD 2004 and loads the program in the RAM 2002 where the program is developed and executed.

In step S1101, the representative color selection unit 106 acquires the color distribution chart of the block image of the processing target acquired in the color distribution analyzing process by the color distribution analysis unit 103, information about the number of pixels existing in each of bins, and the determination result of the attribute of the block image by the block attribute determination unit 105. In the processes in step S1102 and thereafter, the block image whose attribute is the character block is determined in its colors of the character portion and the background portion, and the block image whose attribute is the non-character block is determined in its color of the background.

In step S1102, the representative color selection unit 106 selects a color of a bin including the greatest number of pixels (for example, an average color of pixels contained in this bin) of the color distribution chart and the respective bins of the color distribution chart obtained in step S1101 as a representative color 1.

In step S1103, the representative color selection unit 106 determines whether the block image of the processing target has been determined as the character block. If it is determined that the block image has not been determined as the character block (determined as the non-character block) (NO in step S1103), the representative color determined in step S1102 is output as the representative color. If it is determined that the block image has been determined as the character block (YES in step S1103), then in steps S1104 to S1106, another representative color is further selected.

In step S1104, the representative color selection unit 106 determines whether there is any bin having a different range in the hue from that of the representative color 1 in the acquired color distribution chart. If it is determined that there is any bin having a different range in the hue from that of the representative color 1 (YES in step S1104), then in step S1105, the representative color selection unit 106 selects a color of the bin that is farthest in its hue from that of the representative color 1 (for example, an average color of pixels included in this bin) as a representative color 2.

If it is determined that there is no bin having a different range in the hue from that of the representative color 1 (NO in step S1104), then in step S1106, the representative color selection unit 106 selects a color of the bin that is farthest in its luminosity from that of the representative color 1 (for example, an average color of pixels contained in this bin) as a representative color 2. Additionally, the representative color selecting process of the present invention is not limited to the above-described exemplary embodiment.

In a color quantizing process by the color quantization unit 107, to each of pixels existing in the character block, a color that is closest to the color of the corresponding pixel is selected from the representative colors and assigned. In contrast, to all the pixels existing in the non-character block, the same representative color is assigned. In other words, each of the representative color selection unit 106 and the color quantization unit 107 function as a color assigning unit.

The present exemplary embodiment is designed to determine a character block and a non-character block. If a halftone dot printed document is the processing subject, the non-character block corresponds to a halftone dot block, while if a mixed document including a character document, a photographic document, and a halftone dot printed document is the processing subject, the non-character block is further subjected to a determination process as to whether the block image is a halftone dot block or a background block.

With respect to determination conditions for determining a character block with high reliability based on color information, not limited to those of the present exemplary embodiment, a color distribution, a color characteristic, or another determination condition that allows a character block and a non-character block to be distinguished may be used.

The representative color selection for the character block is exemplified in a case where characters have two colors, however, if characters include multiple colors, many representative colors may be determined. Moreover, the representative color selection for the non-character block is exemplified in a case where one color is used as the background color, however, two or more representative colors may be determined. For example, when the number of pixels included in a bin 1 is the greatest and the number of pixels included in a bin 2 is in the same range as that of the bin 1 with respect to the number of pixels included in each of bins in the color distribution chart, colors of the bin 1 and the bin 2 may be used as the representative colors.

According to the present exemplary embodiment, such a color distribution of a block image after the smoothing process as to make the processing to proceed to step S5404 is considered to be a color distribution specific to the character block. The block image having the color distribution that makes the processing proceed to step S5404 has its block attribute determined by the block attribute determination unit 105, without using the result of the edge analyzing process. Thus, such an arrangement as to omit the edge analyzing process by the edge analysis unit 104 may be used if the processing proceeds to step S5404.

According to the above described first exemplary embodiment, with respect to the recognition of characters and halftone dots, a character block which can be determined by the color distribution analyzing process is first determined, and an attribute of a block image whose characters cannot be not determined by the color distribution analyzing process is determined by the edge analyzing process.

At this time, if the attribute of the block image is determined as a character block with high reliability by the color distribution analysis unit 103, the block attribute determination unit 105 determines the attribute of the block image as the character block. Moreover, if the attribute of the block image is not determined as the character block with high reliability by the color distribution analysis unit 103 (determined as a character block with low reliability or as a determination incapable block), the block attribute determination unit 105 determines the attribute of the block image as the same as the result of determination by the edge analysis unit 104.

According to a second exemplary embodiment, with respect to the recognition of characters and halftone dots, a character block which can be determined by the color distribution analyzing process is first determined, and a block image in which characters are not determined by the color distribution analyzing process is determined by the edge analyzing process. However, in the present exemplary embodiment, with respect to a block image that is not determined as a character block but is considered to be possibly a character block, the determination result by the edge analyzing process is utilized.

More specifically, if a block image is determined as a character with high reliability by the color distribution analysis unit, the block attribute determination unit determines the block image as a character block, and if a block image is determined as a character with low reliability by the color distribution analysis unit, the block attribute determination unit determines the attribute of the block image by the determination result of the edge analysis unit.

<Block Attribute Determination>

The block attribute determining process according to the second exemplary embodiment will be described below in detail with reference to FIG. 10. A processing flow in steps S1201 to S1207 to be described below is realized by the CPU 2001 when it reads out an application program preliminarily stored in the HDD 2004 and loads the program in the RAM 2002 where the program is developed and executed. The other configurations are similar to those of the first exemplary embodiment.

In step S1201, the block attribute determination unit 105 acquires the results of the color distribution analyzing process by the color distribution analysis unit 103 and the edge analyzing process by the edge analysis unit 104.

In step S1203, the block attribute determination unit 105 determines whether the determination result of the color distribution analyzing process acquired in step S1201 corresponds to a character block with high reliability. If the determination result of the color distribution analyzing process is determined as the character block with high reliability (YES in step S1203), then in step S1204, the block attribute determination unit 105 determines the block image of the processing target as the character block.

If the result of the color distribution analyzing process is not determined as the character block with high reliability (NO in step S1203), the block attribute determination unit 105 performs processes from step S1205 to step S1207 to determine whether the block image of the processing target is the character block or the non-character block.

In step S1205, the block attribute determination unit 105 determines whether the result of the color distribution analyzing process corresponds to a character block with low reliability. If the result of the color distribution analyzing process is determined as the character block with low reliability (YES in step S1205), the processing proceeds to step S1206.

In step S1206, the block attribute determination unit 105 determines whether the result of the edge analyzing process corresponds to the character block. If the result of the edge analyzing process is determined as the character block (YES in step S1206), the processing proceeds to step S1204. If the result of the edge analyzing process is not determined as the character block (NO in step S1206), the processing proceeds to step S1207.

If in step S1205, the result of the color distribution analyzing process is not determined as the character block with low reliability (NO in step S1205), the processing proceeds to step S1207.

In step S1207, the block attribute determination unit 105 determines the block image of the processing target as the non-character block.

According to the present exemplary embodiment, if the result of the color distribution analyzing process does not correspond to a character block with high reliability, a determination is made as to whether the block image is a character block or a non-character block based on a certain determination reference derived from the edge analyzing process and the color distribution analyzing process. In the determination as to whether the block image is a character or a character block or a non-character block by the edge analyzing process and the color distribution analyzing process, another determination reference may be used.

As described above, in the present exemplary embodiment, since a block image which is hardly determined as a character block only by the color information, can be determined by additionally using a determination based on the edge information, a character-block determining process can be performed with high precision.

Further, if the determination result of the color distribution analyzing process in the present exemplary embodiment corresponds to the character block with high reliability or the determination incapable block, the block attribute determination unit 105 determines its block attribute without using the result of the edge analyzing process. Thus, the edge analyzing process may be omitted in the case of such a determination result of the color distribution analyzing process, and the block attribute determination unit 105 may be designed so as not to acquire the result of the edge analyzing process in step S1201 if the edge analyzing process is omitted. With this arrangement, it is possible to reduce the amount of processes for use in determining the attribute of a block image.

According to the first and second exemplary embodiments described above, with respect to the recognition of characters and non-characters (for example, halftone dots), a character block which can be determined by the color distribution analyzing process is first determined, and a block image which cannot be determined as a character block by the color distribution analyzing process is determined by the edge analyzing process. According to a third exemplary embodiment, upon recognition of characters and non-characters, a character block which can be determined by the edge analyzing process is first determined, and a block which cannot be determined as a character by the edge analyzing process is determined by the color distribution analyzing process.

A determination process of a character block and/or a non-character block in the third exemplary embodiment will be described in detail below with reference to FIG. 11. In a similar manner to the processing units in FIG. 2, respective processing units from a block input unit 201 to a color quantization unit 207 illustrated in FIG. 11 are realized by the CPU 2001 when it reads out an application program preliminarily stored in the HDD 2004, and loads the application program in the RAM 2002 where the program is developed and executed.

In FIG. 11, the block input unit 201 inputs image data of a block image including a predetermined number of pixels forming an image to be processed to an edge analysis unit 202 and a smoothing processing unit 203.

The edge analysis unit 202 analyzes edge information from the block image input by the block input unit 201, and determines whether the block image is a character block. In this process, the edge intensity of each of pixels existing in the block image is calculated, and the number of pixels having high edge intensity to a certain degree, or the number of edge pixels existing on a portion with connected edges is acquired to determine whether the block image is a character block. The edge analyzing process will be described below in detail with reference to FIG. 12.

A smoothing processing unit 203 performs a smoothing process on the block image transmitted from the block input unit 201 to generate a block image after the smoothing process. The smoothing process to be performed by the smoothing processing unit 203 can be realized by utilizing known filters, such as a low-pass filter, a moving average filter, an edge-preserving smoothing filter, and the like.

A color distribution analysis unit 204 analyzes a distribution of demonstrated colors of pixels in the block image after the smoothing process performed by the smoothing processing unit 203, and determines whether the block image is a character block. The color distribution analyzing process will be described below in detail with reference to FIG. 14.

A block attribute determination unit 205 determines whether the block image is a character block or a non-character block. If the block image is determined by the edge analysis unit 202 as a character block with high reliability, the block attribute determination unit 205 determines the block image as the character block. If the block image is not determined by the edge analysis unit 202 as the character block with high reliability, the block attribute determination unit 205 determines whether the block image is the character block or the non-character block based on the determination result of the block image by the color distribution analysis unit 204.

A representative color selection unit 206 determines a main color of the block image.

The color quantization unit 207 assigns the main color to each of the pixels of the block image.

<Edge Analyzing Process>

The edge analysis unit 202 performs an edge analyzing process on the block image of the processing target to determine whether the block image corresponds to the character block with high reliability. The determination is made based on the characteristics that many pixels having high edge intensity exist in a character region and that many pixels having high edge intensity are connected to one after another therein.

The determination process according to the third exemplary embodiment will be described in detail below with reference to FIG. 12. The processing flow in steps S1401 to S1408 to be described below is realized by the CPU 2001 when it reads out an application program preliminarily stored in the HDD 2004, and loads the application program in the RAM 2002 where the program is developed and executed.

In step S1401, the edge analysis unit 202 extracts an edge from a block image to be processed, and calculates and acquire an amount of edge characteristics of the block image. The edge extraction and the edge characteristic amount calculation process are performed in the similar manner to the processes described in the first exemplary embodiment. In other words, the edge analysis unit 202 functions as an edge acquiring unit.

In step S1402, the edge analysis unit 202 determines whether the number of pixels having high edge intensity is a predetermined threshold value 1 or more. If it is determined that the number of pixels having high edge intensity is the predetermined threshold value 1 or more (YES in step S1402), the processing proceeds to step S1403. In contrast, if it is determined that the number of pixels having high edge intensity is not the predetermined threshold value 1 or more (NO in step S1402), the processing proceeds to step S1408.

In step S1403, the edge analysis unit 202 determines whether the number of pixels having high edge intensity is a predetermined threshold value 2 or less. If it is determined that the number of pixels having high edge intensity is the predetermined threshold value 2 or less (YES in step S1403), the processing proceeds to step S1404. In contrast, if it is determined that the number of pixels having high edge intensity is not the predetermined threshold value 2 or less (NO in step S1403), the processing proceeds to step S1408.

In step S1404, the edge analysis unit 202 determines whether the number of connected edge pixels is a predetermined threshold value 3 or more. If it is determined that the number of connected edge pixels includes connecting units of the predetermined threshold value 3 or more (YES in step S1404), the processing proceeds to step S1405. In contrast, if it is determined that the number of connected edge pixels does not include the connecting units of the predetermined threshold value 3 or more (NO in step S1404), the processing proceeds to step S1408.

In step S1405, the edge analysis unit 202 acquires the connecting unit including the greatest number of connected edge pixels among the connecting units in which the number of the connected edge pixels is the predetermined threshold value 3 or more, and determines whether the greatest number of the connected edge pixels is a predetermined threshold value 4 or less. If it is determined that the greatest number of the connected edge pixels is the predetermined threshold value 4 or less (YES in step S1405), the processing proceeds to step S1406. In step S1406, the edge analysis unit 202 determines the attribute of the block image as the character block with high reliability.

If it is determined that the greatest number of the connected edge pixels is not the predetermined threshold value 4 or less (NO in step S1405), the processing proceeds to step S1407. In step S1407, the edge analysis unit 202 determines the attribute of the block image as the character block with low reliability.

In step S1408, the edge analysis unit 202 determines the attribute of the block image as the character block or the determination incapable block. In other words, the edge analysis unit 202 that executes the above-described processes in steps S1402 to S1408 functions as an edge determination unit.

Example of Edge Characteristic of Character Block with High Reliability Derived from Edge Analyzing Process FIGS. 13A and 13B illustrate examples of edge characteristic of a character block with high reliability according to the third exemplary embodiment. FIG. 13A illustrates an edge of a character on a halftone dot portion having a pattern with weak edge intensity. The number of pixels (white) having high edge intensity is located within a predetermined range, that is the predetermined threshold value 1 or more, and the predetermined threshold value 2 or less. Moreover, the edges are continuous, and the number of pixels that exist on the continuous portion is located within a predetermined range, that is the predetermined threshold value 3 or more, and the predetermined threshold value 4 or less.

FIG. 13B illustrates a character edge on halftone dots with a pattern having high edge intensity. On the entire block image, the number of pixels (white) having high edge intensity is located within a predetermined range, that is the predetermined threshold value 1 or more, and the predetermined threshold value 2 or less. Moreover, the edges are continuous, and the number of pixels that are located on the connected portion exists in a certain degree, that is the predetermined threshold value 3 or more, and the predetermined threshold value 4 or less. By using these conditions of the threshold values, even a block image including edge pixels having high edge intensity on halftone dot portions as illustrated in FIG. 13B can be determined as a character block.

In the third exemplary embodiment, the character block with high reliability is regarded based on the edge information as to satisfy the above-described conditions of the edge characteristic amounts. However, in addition to this, an edge characteristic or a determination condition that can distinguish a character block and a non-character block may be used.

<Color Distribution Analyzing Process>

Referring to FIG. 14, a determination process of a character block by the color distribution analyzing process of the color distribution analysis unit 204 in the present exemplary embodiment will be described in detail below. A processing flow in steps S1601 to S1607 to be described below is realized by the CPU 2001 when it reads out an application program preliminarily stored in the HDD 2004, and loads the application program in the RAM 2002 where the program is developed and executed. Additionally, the color distribution analyzing process according to the present exemplary embodiment is performed as a preliminary process prior to proceeding to processing in step S1601, in the similar manner to those processes in steps S51 to S53 described in the first and second exemplary embodiments, more specifically, the color distribution analysis unit 204 executes conversion of the color space of the block image and arrangements into the color distribution chart.

In step S1601, the color distribution analysis unit 204 acquires a color distribution chart (color distribution characteristic amounts) of a block image to be processed (block image after the smoothing process) that has been subjected to the smoothing process by the smoothing processing unit 203. In other words, the color distribution analysis unit 204 functions as a color distribution acquiring unit.

In step S1602, the color distribution analysis unit 204 determines whether there is any bin that has a different range in the hue based on the acquired color distribution chart. If it is determined that there is any bin that has a different range in the hue (YES in step S1602), the processing proceeds to step S1604. If it is determined that there is no bin that has a different range in the hue (NO in step S1602), the processing proceeds to step S1603.

In step S1603, the color distribution analysis unit 204 determines whether a distance between bins is a predetermined distance or more in the luminosity axis direction. If the distance between these bins is determined as the predetermined distance or more (YES in step S1603), the processing proceeds to step S1604. If the distance between the bins is not determined as the predetermined distance or more (NO in step S1604), the processing proceeds to step S1605.

In step S1605, the color distribution analysis unit 204 calculates an average hue value within each of the bins, and determines whether a difference between the respective average hue values is a predetermined hue difference threshold value or more. If the difference between the average hue values is the predetermined hue difference threshold value or more (YES in step S1605), the processing proceeds to step S1604. If the difference between the average hue values is not determined as the predetermined hue difference threshold value or more (NO in step S1605), the processing proceeds to step S1606.

In step S1606, the color distribution analysis unit 204 calculates an average luminosity value within each of the bins, and determines whether a difference between the respective average luminosity values is a predetermined luminosity difference threshold value or more. If the difference between the average luminosity values is the predetermined luminosity difference threshold value or more (YES in step S1606), the processing proceeds to step S1604. If the difference between the average luminosity values is not determined as the predetermined luminosity difference threshold value or more (NO in step S1606), the processing proceeds to step S1607.

In step S1604, the color distribution analysis unit 204 determines the attribute of the block image of the processing target as the character block.

In step S1607, the color distribution analysis unit 204 determines the attribute of the block image of the processing target as the non-character block. In other words, the color distribution analysis unit 204 that executes the above-described processes in steps S1602 to S1607 functions as a color distribution determination unit.

<Block Attribute Determination>

A block attribute determination process according to the present exemplary embodiment will be described in detail below.

If the attribute of a block image of a processing target is determined in the edge analyzing process by the edge analysis unit 202 as a character block with high reliability, the block attribute determination unit 205 determines the attribute of the block image of the processing target as the character block.

If the attribute of the block image of the processing target is not determined in the edge analyzing process by the edge analysis unit 202 as the character block with high reliability, the block attribute determination unit 205 determines whether the attribute of the block image of the processing target is the character block or the non-character block based on the result of the color distribution analyzing process. At this time, when the attribute of the block image of the processing target is determined as the character block by the color distribution analyzing process by the color distribution analysis unit 204, the block attribute determination unit 205 determines the attribute of the block image of the processing target as the character block.

Further, if the attribute of the block image of the processing target is determined as the non-character block by the color distribution analyzing process by the color distribution analysis unit 204, the block attribute determination unit 205 determines the attribute of the block image of the processing target as the non-character block. In other words, the block attribute determination unit 205 functions as a determination unit.

The functions of the representative color selection unit 206 and the color quantization unit 207 are similar to those of the representative color selection unit 106 and the color quantization unit 107 in the first and second exemplary embodiments.

As described above, according to the present exemplary embodiment, a character region and a non-character region can be determined with high precision. Therefore, the image quality of imaging processing that is switched for each of the regions can be improved, and the character recognition after the extraction of a character portion and the precision of a character vectorization can be improved as well.

In the present exemplary embodiment, such an edge characteristic amount of a block image as to make the processing to proceed to step S1406 is considered to be an edge characteristic amount specific to the character block. The block image having the edge characteristic amount that makes the processing proceed to step S1406 has its block attribute determined by the block attribute determination unit 205, without using the result of the edge analyzing process. Thus, such an arrangement as to omit the color distribution analyzing process by the smoothing processing unit 203 and the color distribution analysis unit 204 may be used if the processing proceeds to step S1406.

According to the third exemplary embodiment described above, with respect to the recognition of characters and non-characters (for example, halftone dots), a character block which can be determined by the edge analyzing process is first determined, and another block in which characters cannot be determined by the edge analyzing process is determined by the color distribution analyzing process. In other words, if the attribute of a block image of a processing target is determined as a character with high reliability by the edge analysis unit 202, the block attribute determination unit 205 determines the attribute of the block image of the processing target as the character block.

If the attribute of the block image of the processing target is not determined as the character block with high reliability (determined as a character block with low reliability or a determination incapable block) by the edge analysis unit 202, the block attribute determination unit 205 determines the attribute thereof based on the determination result as the character block or the non-character block made by the color distribution analysis unit 204.

According to a fourth exemplary embodiment, with respect to the recognition of characters and non-characters, a character block which can be determined by the edge analyzing process is first determined, and an attribute of another block image in which characters cannot be determined by the edge analyzing process is determined by the color distribution analyzing process. However, in the present exemplary embodiment, with respect to a block image that is not determined as a character block, but is considered to be possibly a character block, the determination result by the color distribution analyzing process is utilized.

In other words, if the attribute the block image is determined as the character with high reliability by the edge analyzing process, the block attribute determination unit determines the attribute of the block image as the character block, and if the attribute of the block image is determined as the character with low reliability by the edge analyzing process, the block attribute determination unit determines the attribute of the block image by the determination result of the color distribution analyzing process.

<Block Attribute Determination>

A great difference between the present exemplary embodiment and the third exemplary embodiment is a processing flow performed by the block attribute determination unit 205. Referring to FIG. 15, the determination process between a character block and a non-character block in the present exemplary embodiment will be described in detail. A processing flow in steps S1701 to S1707 to be described below is realized by the CPU 2001 when it reads out an application program preliminarily stored in the HDD 2004 and loads the program in the RAM 2002 where the program is developed and executed. The other configurations are similar to those of the third exemplary embodiment.

In step S1701, the block attribute determination unit 205 acquires the results of the edge analyzing process by the edge analysis unit 202 and the color distribution analyzing process by the color distribution analysis unit 204.

In step S1703, the block attribute determination unit 205 determines whether the determination result of the edge analyzing process acquired in step S1701 corresponds a character block with high reliability. If the determination result of the edge analyzing process is determined as the character block with high reliability (YES in step S1703), the processing proceeds to step S1704. In step S1704, the block attribute determination unit 205 determines the block image of the processing target as the character block.

If the result of the edge analyzing process in step S1703 is not determined as the character block with high reliability (NO in step S1703), the processing proceeds to step S1705. In step S1705, the block attribute determination unit 205 determines whether the result of the edge analyzing process corresponds to the character block with low reliability.

If the result of the edge analyzing process is determined as the character block with low reliability (YES in step S1705), the processing proceeds to step S1706. Alternatively, if the result of the edge analyzing process is not determined as the character block with low reliability (NO in step S1705), the processing proceeds to step S1707.

In step S1706, the block attribute determination unit 205 determines whether the result of the color distribution analyzing process corresponds to the character block. If the result of the color distribution analyzing process is determined as the character block (YES in step S1706), the processing proceeds to step S1704. If the result of the color distribution analyzing process is not determined as the character block (NO in step S1706), the processing proceeds to step S1707.

In step S1707, the block attribute determination unit 205 determines the block image of the processing target as the non-character block.

According to the present exemplary embodiment, if the result of the color distribution analyzing process does not correspond to a character block with high reliability, a determination is made as to whether the block image is a character block or a non-character block based on a certain determination reference derived from the edge analyzing process and the color distribution analyzing process. In the determination as to whether the block image is a character block or a non-character block, by the edge analyzing process and color distribution analyzing process, another determination reference may be used.

As described above, according to the present exemplary embodiment, since a block image which is hardly determined as a character block only by the edge information can be determined by additionally using a determination based on the color information, a character-block determining process can be performed with high precision.

Further, if the determination result of the edge analyzing process in the present exemplary embodiment corresponds to a character block with high reliability or a determination incapable block, the block attribute determination unit 205 determines its block attribute without using the result of the color distribution analyzing process. Therefore, the color distribution analyzing process may be omitted in the case of such a determination result of the edge analyzing process, and the block attribute determination unit 205 may be designed so as not to acquire the result of the color distribution analyzing process in step S1701 if the color distribution analyzing process is omitted. With this arrangement, it is possible to reduce the amount of processes for use in determining the attribute of a block image.

In the first to fourth exemplary embodiments described above, with respect to the recognition of characters and non-characters (for example, halftone dots), the degree of reliability according to a character block is utilized. In a fifth exemplary embodiment, the degree of reliability relating to halftone dot blocks is utilized. In the present exemplary embodiment, the configuration as illustrated in the functional block diagram in FIG. 11 is utilized unless otherwise described in particular, and the present exemplary embodiment is described by utilizing FIG. 11. Moreover, respective processing units from the block input unit 201 to the color quantization unit 207 to be described in the present exemplary embodiment are realized by the CPU 2001 when it reads out an application program preliminarily stored in the HDD 2004, and loads the program in the RAM 2002 where the program is developed and executed.

The block input unit 201 inputs image data of a block image including a predetermined number of pixels forming an image to be processed into the edge analysis unit 202 and the smoothing processing unit 203.

The edge analysis unit 202 analyzes edge information from the block image input by the block input unit 201, and determines whether the block image is a halftone dot block. In this process, the CPU 2001 calculates the edge intensity of each of pixels existing in the block image, and acquires the number of pixels having high edge intensity to a certain degree, the number of edge pixels existing on a portion with connected edges (connecting units), and the total number of the connecting units to determine whether the block image is a halftone dot block. The edge analyzing process will be described below in detail with reference to FIG. 16.

The smoothing processing unit 203 performs a smoothing process on a block image transmitted from the block input unit 201. The smoothing process to be performed by the smoothing processing unit 203 can be realized by utilizing known filters, such as a low-pass filter, a moving average filter, an edge-preserving smoothing filter, and the like.

The color distribution analysis unit 204 analyzes a distribution of demonstrated colors of pixels of the block image after the smoothing process performed by the smoothing processing unit 203, and determines whether the block image is a halftone dot block. The color distribution analyzing process will be described below in detail with reference to FIG. 14 which is utilized in the explanation of the third exemplary embodiment.

The block attribute determination unit 205 determines whether the block image is a halftone dot block or a non-halftone dot block. If the block image is determined by the edge analysis unit 202 as a halftone dot block with high reliability, the block attribute determination unit 205 determines the block image as the halftone dot block.

If the block image is not determined by the edge analysis unit 202 as a halftone dot block with high reliability, the block attribute determination unit 205 determines whether the block image is the halftone dot block or the non-halftone dot block based on the determination result of the block image by the color distribution analysis unit 204.

The representative color selection unit 206 determines a main color of the block image.

The color quantization unit 207 assigns the main color to each of the pixels of the block image.

<Edge Analyzing Process>

An edge analyzing process is performed on a block image of a processing target to determine whether the block image corresponds to a halftone dot block with high reliability. The determination is made based on the characteristics specific to a halftone dot region in which not so many pixels having high edge intensity exist in the halftone dot region, many pixels having high edge intensity are connected to one after another, and a large number of connecting units is located therein.

The determination process according to the fifth exemplary embodiment will be described in detail below with reference to FIG. 16. The processing flow in steps S1801 to S1808 to be described below is realized by the CPU 2001 when it reads out an application program preliminarily stored in the HDD 2004, and loads the application program in the RAM 2002 where the program is developed and executed.

In step S1801, the edge analysis unit 202 extracts an edge from a block image of a processing subject. In step S1802 the edge analysis unit 202 calculates the amount of edge characteristics based on the extracted edges. The edge extraction and the edge characteristic amount calculation process are performed in the similar manner to the processes described in the first exemplary embodiment.

In step S1803, the edge analysis unit 202 determines whether the number of edge connecting units is a predetermined threshold value 1 or more. If it is determined that the number of edge connecting units is the predetermined threshold value 1 or more (YES in step S1803), the processing proceeds to step S1804. In contrast, if it is determined that the number of edge connecting units is not the predetermined threshold value 1 or more (NO in step S1803), the processing proceeds to step S1808.

In step S1804, the edge analysis unit 202 determines whether the number of pixels having high edge intensity is a predetermined threshold value 2 or less. If it is determined that the number of pixels having high edge intensity is the predetermined threshold value 2 or less (YES in step S1804), the processing proceeds to step S1805. In contrast, if it is determined that the number of pixels having high edge intensity is not the predetermined threshold value 2 or less (NO in step S1804), the processing proceeds to step S1807.

In step S1805, the edge analysis unit 202 determines whether the number of connected edge pixels is a predetermined threshold value 3 or more. If it is determined that the number of connected edge pixels is the predetermined threshold value 3 or more (YES in step S1805), the processing proceeds to step S1806. In contrast, if it is determined that the number of connected edge pixels does not include connecting units of the predetermined threshold value 3 or more (NO in step S1805), the processing proceeds to step S1807.

In step S1806, the edge analysis unit 202 determines the block image as a halftone dot block with high reliability. Such edge information as to make the processing proceed to step S1806 is considered to be edge information that is specific to the halftone dot block.

In step S1807, the edge analysis unit 202 determines the block image as a halftone dot block with low reliability. Such edge information as to make the processing proceed to step S1807 is considered to be edge information that is in common with the character block and the other attribute blocks.

In step S1808, the edge analysis unit 202 determines the block image as a halftone dot block or a determination incapable block.

<Color Distribution Analyzing Process>

The halftone dot block determination process in the color distribution analyzing process by the color distribution analysis unit 204 according to the present exemplary embodiment is performed in the similar manner to the determination process in FIG. 14. The halftone dot block determination process in the color distribution analyzing process according to the present exemplary embodiment is different from the determination process in FIG. 14 in that a block that is determined as a character block in step 1604 is determined as a non-halftone dot block while a block that is determined as a non-character block in step 1607 is determined as a halftone dot block. In the color distribution analyzing process according to the present exemplary embodiment also, the similar processes to those in steps S51 to S53 described in the first and second exemplary embodiments, more specifically, conversion of the block image into the color space and arrangements thereof into the color distribution chart are performed by the color distribution analysis unit 204 as a preliminarily process.

<Block Attribute Determination>

The block attribute determination process in the present exemplary embodiment is performed based on the flow similar to the processing flow illustrated in FIG. 15 of the third exemplary embodiment. A block attribute determination process according to the present exemplary embodiment will be described in detail below referring to the flow chart in FIG. 15 as a support. The processing flow in steps S1701 to S1707 to be described below is realized by the CPU 2001 when it reads out an application program preliminarily stored in the HDD 2004 and loads the program in the RAM 2002 where the program is developed and executed.

In step S1701, the block attribute determination unit 205 acquires the results of the edge analyzing process and the color distribution analyzing process.

In step S1703, the block attribute determination unit 205 determines whether the result of the edge analyzing process corresponds to a halftone dot block with high reliability. If the result of the edge analyzing process is determined as the halftone dot block with high reliability (YES in step S1703), the processing proceeds to step S1704. In step S1704, the block attribute determination unit 205 determines the block image of the processing target as the halftone dot block.

If the result of the edge analyzing process is not determined as the halftone dot block with high reliability (NO in S1703), the processing proceeds to step S1705. In step S1705, the block attribute determination unit 205 determines whether the result of the edge analyzing process corresponds to a halftone dot block with low reliability.

If the result of the edge analyzing process is determined as the halftone dot block with low reliability (YES in step S1705), the processing proceeds to step S1706. In contrast, if the result of the edge analyzing process is not determined as the halftone dot block with low reliability (NO in step S1705), the processing proceeds to step S1707.

In step S1706, the block attribute determination unit 205 determines whether the result of the color distribution analyzing process corresponds to the halftone dot block. If the result of the color distribution analyzing process is determined as the halftone dot block (YES in step S1706), the processing proceeds to step S1704. If the result of the color distribution analyzing process is not determined as the halftone dot block (NO in step S1706), the processing proceeds to step S1707.

In step S1707, the block attribute determination unit 205 determines the block image of the processing target as the non-halftone dot block.

According to the present exemplary embodiment, if the result of the color distribution analyzing process does not correspond to a halftone dot block with high reliability, a determination is made as to whether the block image is a halftone dot block or a non-halftone dot block based on a certain determination reference derived from the edge analyzing process and the color distribution analyzing process. In the determination as to whether the block image is a halftone dot block or a non-halftone dot block by the edge analyzing process and color distribution analyzing process, another determination reference may be used.

The functions of the representative color selection unit 206 and the color quantization unit 207 are similar to those of the representative color selection unit 106 and the color quantization unit 107 of the first to fourth exemplary embodiments described above. A difference from the first to fourth exemplary embodiments is in that the representative color 1 is assigned to each of pixels within a block image determined as a halftone dot block, and the representative color 1 and the representative color 2 are assigned to each of pixels within a block image determined as a non-halftone dot block.

As described above, according to the present exemplary embodiment, a halftone dot region and a non-halftone dot region can be determined with high precision, so that the image quality of imaging processing that is switched for each of the regions can be improved.

Further, if the determination result of the edge analyzing process in the present exemplary embodiment corresponds to a halftone dot block with high reliability or a determination incapable block, the block attribute determination unit 205 determines its block attribute without using the result of the color distribution analyzing process. Therefore, the color distribution analyzing process may be omitted in the case of such a determination result of the edge analyzing process, and the block attribute determination unit 205 may be designed so as not to acquire the result of the color distribution analyzing process in step S1701 if the color distribution analyzing process is omitted. With this arrangement, it is possible to reduce the amount of processes for use in determining the attribute of a block image.

Aspects of the present invention can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-251161 filed Nov. 9, 2010, which is hereby incorporated by reference herein in its entirety.

What is claimed is:

1. An image processing apparatus capable of dividing a document image into block images, each including a predetermined number of pixels, and determining whether an attribute of each of the divided block images is a character, the image processing apparatus comprising:
- a smoothing unit configured to smooth a block image to generate a smoothed block image;
- a color distribution acquiring unit configured to acquire a color distribution characteristic amount of the smoothed block image;
- an edge acquiring unit configured to acquire an edge characteristic amount of the block image;
- a color distribution determination unit configured to determine whether an attribute of the block image is a character based on the color distribution characteristic amount acquired by the color distribution acquiring unit;
- an edge determination unit configured to determine whether the attribute of the block image is a character based on the edge characteristic amount acquired by the edge acquiring unit; and
- a determination unit configured, in a case where the color distribution determination unit determines with high reliability that the attribute of the block image is a character, to determine the attribute of the block image is a character, and in a case where the color distribution determination unit determines with not high reliability that the attribute of the block image is a character, to determine the attribute of the block image based on a determination result by the edge determination unit.

2. The image processing apparatus according to claim 1, wherein in a case where the attribute of the block image is determined to be a character by the color distribution determination unit with high reliability, the determination unit determines the attribute of the block image as the character, and in a case where the attribute of the particular block image is determined to be a character by the color distribution determination unit with low reliability, the determination unit determines the attribute of the block image based on the determination result by the edge determination unit.

3. The image processing apparatus according to claim 1, wherein the color distribution acquiring unit acquires the color distribution characteristic amount from a color histogram.

4. The image processing apparatus according to claim 3, wherein the color histogram is a frequency distribution in which the number of pixels belonging to each of bins formed by dividing a color space based on at least luminosity and hue is distributed.

5. The image processing apparatus according to claim 1, further comprising:
- a color assigning unit configured, in a case where the attribute of the block image is determined to be a character by the determination unit, to assign a plurality of colors that are representative of the block image to the block image, and in a case where the attribute of the block image is determined not to be a character by the determination unit, to assign a single color that is representative of the block image to the block image.

6. The image processing apparatus according to claim 1, wherein the color distribution determination unit determines the attribute of the block image is a character with high reliability in a case where the color distribution characteristic amount acquired by the color distribution acquiring unit matches a first condition, and determines the attribute of the block image is a character with not high reliability in a case where the color distribution characteristic amount acquired by the color distribution acquiring unit does not match the first condition.

7. The image processing apparatus according to claim 6, wherein
- the color distribution characteristic amount includes at least one of a difference in a hue in the block image and a difference in a luminosity in the block image, and
- the first condition is that the difference in the hue in the block image is a first threshold or more or the difference in the luminosity in the block image is a second threshold or more.

8. The image processing apparatus according to claim 1, wherein
- the color distribution determination unit determines the attribute of the block image is a character with high reliability in a case where the color distribution characteristic amount acquired by the color distribution acquiring unit matches a first condition, determines the attribute of the block image is a character with low reliability in a case where the color distribution characteristic amount acquired by the color distribution acquiring unit matches a second condition, and determines the attribute of the block image is undetermined in a case where the color distribution characteristic amount acquired by the color distribution acquiring unit matches neither the first nor the second condition, and
- the determination unit determines the attribute of the block image is a character in a case where the color distribution determination unit determines the attribute of the block image is a character with high reliability, determines the attribute of the block image based on the determination result by the edge determination unit in a case where the color distribution determination unit determines the attribute of the block image is a character with low reliability, and determines the attribute of the block image is undetermined in a case where the color distribution determination unit determines the attribute of the block image is undetermined.

9. The image processing apparatus according to claim 8, wherein
- the color distribution characteristic amount includes at least one of a difference in a hue in the block image and a difference in a luminosity in the block image,
- the first condition is that the difference in the hue in the block image is a first threshold or more or the difference in the luminosity in the block image is a second threshold or more, and
- the second condition that the difference in the hue in the block image is the first threshold or less and is a third threshold or more or the difference in the luminosity in the block image is the second threshold or less and is a fourth threshold or more.

10. An image processing apparatus capable of dividing a document image into block images, each including a predetermined number of pixels, and determining whether an attribute of each of the divided block images corresponds to a predetermined attribute, the image processing apparatus comprising:
- a smoothing unit configured to smooth a block image to generate a smoothed block image;
- a color distribution acquiring unit configured to acquire a color distribution characteristic amount of the smoothed block image;
- an edge acquiring unit configured to acquire an edge characteristic amount of the block image;
- an edge determination unit configured to determine whether an attribute of each block image is the predetermined attribute based on the edge characteristic amount acquired by the edge acquiring unit;

a color distribution determination unit configured to determine whether the attribute of the block image is the predetermined attribute based on the color distribution characteristic amount acquired by the color distribution acquiring unit; and a determination unit configured, in a case where the attribute of a block image is determined to be the predetermined attribute by the edge determination unit with high reliability, to determine the attribute of the particular block image to be the predetermined attribute, and in a case where the attribute of the block image is determined to be the predetermined attribute by the edge determination unit with not high reliability, to determine the attribute of the block image as a determination result by the color distribution determination unit.

11. The image processing apparatus according to claim 10, wherein the edge determination unit determines the attribute of the block image to be the predetermined attribute with high reliability in a case where the edge characteristic amount acquired by the edge acquiring unit matches a first condition, determines the attribute of the block image to be the predetermined attribute with low reliability in a case where the edge characteristic amount acquired by the edge acquiring unit matches a second condition, and determines the attribute of the block image to be undetermined in a case where the edge characteristic amount acquired by the edge acquiring unit matches a third condition; and the determination unit determines the attribute of the block image to be the predetermined attribute in a case where the edge determination unit determines the attribute of the block image to be the predetermined attribute with high reliability, in a case where the edge determination unit determines the attribute of the block image to be the predetermined attribute with low reliability, and determines the attribute of the block image to be undetermined in a case where the edge determination unit determines the attribute of the block image to be undetermined.

12. The image processing apparatus according to claim 10, further comprising:

a color assigning unit configured, in a case where the attribute of the block image is determined to be the predetermined attribute by the determination unit, to assign a plurality of colors that are representative of the block image to the block image, and in a case where the attribute of the block image is determined not to be the predetermined attribute by the determination unit, to assign a single color that is representative of the block image to the block image.

13. The image processing apparatus according to claim 10, wherein the edge determination unit determines the attribute of the block image to be the predetermined attribute with high reliability in a case where the edge characteristic amount acquired by the edge acquiring unit matches a first condition, and determines the attribute of the block image to be the predetermined attribute with not high reliability in a case where the edge characteristic amount acquired by the edge acquiring unit does not match the first condition.

14. The image processing apparatus according to claim 13, wherein the edge characteristic amount includes a number of pixels having high edge intensity in the block image and a number of connected edge pixels in the block image, and the first condition is that the number of pixels having high edge intensity in the block image is a first threshold or more and is a second threshold or less and the number of connected edge pixels in the block image is a third threshold or more and is a fourth threshold or less.

15. The image processing apparatus according to claim 10, wherein the edge determination unit determines the attribute of the block image to be the predetermined attribute with high reliability in a case where the edge characteristic amount acquired by the edge acquiring unit matches a first condition, determines the attribute of the block image to be the predetermined attribute with low reliability in a case where the edge characteristic amount acquired by the edge acquiring unit matches a second condition, and determines the attribute of the block image to be undetermined in a case where the edge characteristic amount acquired by the edge acquiring unit matches neither the first condition nor the second condition, and the determination unit determines the attribute of the block image to be the predetermined attribute in a case where the edge determination unit determines the attribute of the block image to be the predetermined attribute with high reliability, determines the attribute of the block image based on the determination result by the color distribution determination unit in a case where the edge determination unit determines the attribute of the block image to be the predetermined attribute with low reliability, and determines the attribute of the block image is undetermined in a case where the edge determination unit determines the attribute of the block image to be undetermined.

16. The image processing apparatus according to claim 15, wherein the edge characteristic amount includes a number of pixels having high edge intensity in the block image and a number of connected edge pixels in the block image, the first condition is that the number of pixels having high edge intensity in the block image is a first threshold or more and is a second threshold or less and the number of connected edge pixels in the block image is a third threshold or more and is a fourth threshold or less, and the second condition is that the number of pixels having high edge intensity in the block image is the first threshold or more and is the second threshold or less and the number of connected edge pixels in the block image is more than the fourth threshold.

17. A method of image processing for dividing a document image into block images, each including a predetermined number of pixels, and determining whether an attribute of each of the divided block images is a character, the method comprising:

allowing a smoothing unit to smooth a block image to generate a smoothed block image;

allowing a color distribution acquiring unit to acquire a color distribution characteristic amount of the smoothed block image;

allowing an edge acquiring unit to acquire an edge characteristic amount of the block image;

allowing a color distribution determination unit to determine whether the attribute of the block image is a character based on the acquired color distribution characteristic amount;

allowing an edge determination unit to determine whether the attribute of the block image is a character based on the acquired edge characteristic amount;

allowing a determination unit, in a case where determination by the color distribution determination unit is as a character with high reliability, to determine the attribute of the block image as a character, and in a case where the determination by the color distribution determination unit is a character with not high reliability, to determine the attribute of the block image based on a determination result by the edge determination unit.

18. A method of image processing for dividing a document image into block images, each including a predetermined number of pixels, and determining whether an attribute of each of the divided block images is a predetermined attribute, the method comprising:
   allowing a smoothing unit to smooth each block image to generate a smoothed block image;
   allowing a color distribution acquiring unit to acquire a color distribution characteristic amount of the smoothed block image;
   allowing an edge acquiring unit to acquire an edge characteristic amount of the block image;
   allowing an edge determination unit to determine whether the attribute of the block image is the predetermined attribute based on the acquired edge characteristic amount;
   allowing a color distribution determination unit to determine whether the attribute of the block image is the predetermined attribute based on the acquired color distribution characteristic amount; and
   allowing a determination unit, in a case where the attribute of the block image is determined to be the predetermined attribute with high reliability by the edge determination unit, to determine the attribute of the block image to be the predetermined attribute, and in the case where the attribute of the block image is determined to be the predetermined attribute with not high reliability by the edge determination unit, to determine the attribute of the block image based on a determination result by the color distribution determination unit.

19. A non-transitory computer readable storage medium storing a computer program allowing one or a plurality of microprocessors to execute image processing for dividing a document image into block images, each including a predetermined number of pixels, and determining whether an attribute of each of the divided block images is a character, the computer program allowing the one or the plurality of microprocessors to function as:
   a smoothing unit configured to smooth a block image to generate a smoothed block image;
   a color distribution acquiring unit configured to acquire a color distribution characteristic amount of the smoothed block image;
   an edge acquiring unit configured to acquire an edge characteristic amount of the block image;
   a color distribution determination unit configured to determine whether an attribute of the block image is a character based on the color distribution characteristic amount acquired by the color distribution acquiring unit;
   an edge determination unit configured to determine whether the attribute of the block image is a character based on the edge characteristic amount acquired by the edge acquiring unit; and
   a determination unit configured, in a case where the color distribution determination unit determines with high reliability that the attribute of the block image is a character, to determine the attribute of the block image is a character, and in a case where the color distribution determination unit determines with not high reliability that the attribute of the block image is a character, to determine the attribute of the block image as a determination result by the edge determination unit.

* * * * *